(12) United States Patent
Zhu et al.

(10) Patent No.: US 12,435,302 B2
(45) Date of Patent: Oct. 7, 2025

(54) METHOD AND APPARATUS FOR HIGH-THROUGHPUT MASKLESS FABRICATION OF POLYMER SCAFFOLDS AND BIOLOGICAL TISSUES IN MULTI-WELL PLATES

(71) Applicant: Allegro 3D, Inc., San Diego, CA (US)

(72) Inventors: Wei Zhu, San Diego, CA (US); Wei Wei, San Diego, CA (US)

(73) Assignee: Allegro 3D, Inc., San Diego, CA (US)

( * ) Notice: Subject to any disclaimer, the term of this patent is extended or adjusted under 35 U.S.C. 154(b) by 858 days.

(21) Appl. No.: 17/496,707

(22) Filed: Oct. 7, 2021

(65) Prior Publication Data
US 2022/0025311 A1  Jan. 27, 2022

Related U.S. Application Data

(63) Continuation of application No. PCT/US2020/027737, filed on Apr. 10, 2020.
(Continued)

(51) Int. Cl.
*C12M 3/00* (2006.01)
*B33Y 10/00* (2015.01)
(Continued)

(52) U.S. Cl.
CPC ............ *C12M 21/08* (2013.01); *B33Y 10/00* (2014.12); *B33Y 30/00* (2014.12); *C12M 23/12* (2013.01);
(Continued)

(58) Field of Classification Search
None
See application file for complete search history.

(56) References Cited

U.S. PATENT DOCUMENTS 9,261,454 B2   2/2016 Egeler et al.
9,931,633 B2   4/2018 Egeler et al.
(Continued)

FOREIGN PATENT DOCUMENTS

CN   105137720 A   12/2015
CN   105479751 A   4/2016
(Continued)

OTHER PUBLICATIONS

Miri, et al. "Microfluidics-Enabled Multimaterial Maskless Stereolithographic Bioprinting". Adv. Mater. 2018, 30, 1800242 (Year: 2018).*
(Continued)

*Primary Examiner* — Michael A Marcheschi
*Assistant Examiner* — Nathan G Esperon
(74) *Attorney, Agent, or Firm* — McCarter & English, LLP

(57) ABSTRACT

Disclosed are methods and apparatuses for fabrication of polymer scaffolds and biological tissues in the multi-well plates in a rapid, high-throughput, controllable and reproducible manner by using optical exposure of the wells to patterned probe light without using a photomask. In some aspects, an apparatus includes a light source to produce a probe light; a digital display device to spatially modulate the probe light to encode a programmable spatial pattern in a spatially-modulated light; a stage to hold a target surface or chamber, wherein the target surface or chamber contains a solution including a material that forms a scaffold or construct based on interaction with the spatially-modulated light projected at the solution; and a computer control device in communication with the light source and the digital display device to control a change of the solution including the material to form the scaffold or construct.

19 Claims, 16 Drawing Sheets

Related U.S. Application Data

(60) Provisional application No. 62/832,819, filed on Apr. 11, 2019.

(51) Int. Cl.
| | |
|---|---|
| *B33Y 30/00* | (2015.01) |
| *B33Y 80/00* | (2015.01) |
| *C12M 1/00* | (2006.01) |
| *C12M 1/32* | (2006.01) |
| *C12M 1/34* | (2006.01) |
| *C12N 5/071* | (2010.01) |
| *G01N 33/50* | (2006.01) |

(52) U.S. Cl.
CPC ............ *C12M 23/20* (2013.01); *C12M 41/10* (2013.01); *C12M 41/36* (2013.01); *C12M 41/44* (2013.01); *C12N 5/0671* (2013.01); *C12N 5/0697* (2013.01); *G01N 33/5008* (2013.01); *B33Y 80/00* (2014.12); *C12N 2513/00* (2013.01)

(56) References Cited

U.S. PATENT DOCUMENTS

| | | | |
|---|---|---|---|
| 10,073,346 | B2 | 9/2018 | Hribar et al. |
| 2005/0264805 | A1 | 12/2005 | Cromwell et al. |
| 2011/0163469 | A1 | 7/2011 | Little et al. |
| 2012/0223214 | A1* | 9/2012 | Lee ................... G01N 21/6456 250/206 |
| 2015/0352546 | A1* | 12/2015 | Egeler ................. C09D 183/08 422/549 |
| 2016/0175800 | A1 | 6/2016 | Murphy et al. |
| 2016/0298087 | A1* | 10/2016 | Qu ........................ C12N 5/0671 |
| 2017/0087766 | A1* | 3/2017 | Chung ............... G01N 33/5058 |
| 2017/0128601 | A1* | 5/2017 | DeCiccio ............... B33Y 10/00 |
| 2018/0050338 | A1 | 2/2018 | Beebe et al. |
| 2018/0257297 | A1* | 9/2018 | Matheu ............... A61L 27/3625 |
| 2018/0281284 | A1* | 10/2018 | Elgar .................... B29C 64/371 |
| 2020/0209738 | A1* | 7/2020 | Batoni ................. G02B 5/1838 |
| 2021/0162408 | A1* | 6/2021 | Sabaawy ............. B01L 3/50855 |

FOREIGN PATENT DOCUMENTS

| | | |
|---|---|---|
| CN | 105563830 A | 5/2016 |
| CN | 106660236 A | 5/2017 |
| CN | 106799835 A | 6/2017 |
| CN | 114072269 A | 2/2022 |
| WO | 2013033080 A1 | 3/2013 |
| WO | 2015179572 A1 | 11/2015 |
| WO | 2017176584 A1 | 10/2017 |

OTHER PUBLICATIONS

Challenges and opportunities report—Mar. 2004. U.S. Food Drug Adm. Challenges Oppor. Report. 8 (2004).
Edmondson, R., Broglie, J. J., Adcock, A. F. & Yang, L. Three-dimensional cell culture systems and their applications in drug discovery and cell-based biosensors. Assay Drug Dev. Technol. 12, 207-18 (2014).
Guillemot, F. et al. High-throughput laser printing of cells and biomaterials for tissue engineering. Acta Biomater. 6, 2494-2500 (2010).
Guillotin, B. et al. Laser assisted bioprinting of engineered tissue with high cell density and microscale organization. Biomaterials 31, 7250-7256 (2010).
Kaitin, K. I. Deconstructing the drug development process: the new face of innovation. Clin. Pharmacol. Ther. 87, 356-61 (2010).
Khetani, S. R. & Bhatia, S. N. Microscale culture of human liver cells for drug development. Nat. Biotechnol. 26, 120-6 (2008).
Tsang, Liu V. et al. Fabrication of 3D hepatic tissues by additive photopatterning of cellular hydrogels. Faseb J. 21, 790-801 (2007).
Paul, S. M. et al. How to improve RD productivity: The pharmaceutical industry's grand challenge. Nat. Rev. Drug Discov. 9, 203-214 (2010).
Roth, E., et al. Inkjet printing for high-throughput cell patterning. Biomaterials 25, 3707-3715 (2004).
International Search Report and Written Opinion mailed on Jul. 1, 2020 for International Application No. PCT/US2020/027737, filed on Apr. 10, 2020 (18 pages).
Warner, J.; "3D Printing of Static and Hybrid Dynamic Biomaterial Scaffolds for Tissue Engineering"; University of California, San Diego; https://escholarship.org/uc/item/92w1161r; 2017 (67 pages).
Office Action mailed Jun. 30, 2023 for Chinese Patent Application No. 202080043692.1.
Extended European Search Report dated Jan. 5, 2023 for European Patent Application No. 20788201.0 (9 pages).

* cited by examiner

METHOD AND APPARATUS FOR HIGH-THROUGHPUT MASKLESS FABRICATION OF POLYMER SCAFFOLDS AND BIOLOGICAL TISSUES IN MULTI-WELL PLATES

CROSS-REFERENCE TO RELATED APPLICATIONS

This patent document is a continuation of PCT International Patent Application No. PCT/US2020/027737, filed on Apr. 10, 2020, which claims priority to and benefits of U.S. Provisional Patent Application No. 62/832,819, titled "METHOD AND APPARATUS FOR HIGH-THROUGHPUT MASKLESS FABRICATION OF POLYMER SCAFFOLDS AND BIOLOGICAL TISSUES IN MULTI-WELL PLATES" and filed on Apr. 11, 2019. The entire contents of the aforementioned patent applications are incorporated by reference as part of the disclosure of this patent document.

TECHNICAL FIELD

This patent document relates to designs and fabrication of structures or devices for cell or tissue culturing.

SUMMARY

The disclosure of this patent document includes examples embodiments and implementations of methods and apparatuses for the high-throughput fabrication of: (i) polymer scaffolds for cell or tissue culturing to guide cell or tissue behaviors and functions; and (ii) engineered tissue constructs, such as liver tissues, heart tissues, kidney tissues, lung tissues, neural tissues, bone tissues, cartilage tissues, and tumor models for drug screening, diagnostics, and therapeutics.

In some example embodiments and implementations, disclosed is a maskless method and apparatus for the fabrication of polymer scaffolds and biological tissues in multi-well plates in a rapid, high-throughput, controllable and reproducible manner. With the assistance of a digital display device (e.g., digital micromirror devices (DMDs), liquid crystal displays (LCDs), light-emitting diode (LED) displays), optical patterns are projected to the bottom of the multi-well plates to selectively polymerize and define the shape, size, and regional mechanical properties of the polymer scaffolds or biological tissue constructs. The materials for the fabrication can include, but not limited to, photopolymerizable monomer solutions, photoinitiators, cells, nanoparticles, and other biomolecules. The multi-well plates broadly include the conventional and customized cell/tissue culture vessels with single or a plural number of wells/chambers (e.g. 1, 2, 4, 6, 8, 12, 24, 48, 96, 384, etc.). The bottoms of the wells can be chemically treated for improved adhesion of the polymerized structures to the bottoms. In some embodiments, for example, a multi-probe insert can be used to control the thickness of the polymerized structure. In some embodiments, for example, the thickness of the polymer structure can be controlled by the volume of monomer solutions added to each well. The side wall of the wells can have specially designed physical features to reduce or eliminate the meniscus formed between the liquid solution surface and the side wall. The surface of the side wall can also be chemically treated to reduce the meniscus, for example, with hydrophobic or superhydrophobic coatings. The physical features and the chemical coatings can be combined for optimal reduction or elimination of the meniscus.

In some aspects, a high-throughput, maskless fabrication apparatus for fabricating scaffolds or constructs includes a light source to produce a probe light; a digital display device to receive the probe light and to cause spatial modulation of the received probe light to produce a programmable spatial pattern in a spatially-modulated light; a stage to hold a target surface or chamber, wherein the target surface or chamber contains a solution including a material that forms a scaffold or construct based on interaction with the spatially-modulated light projected at the solution; and a computer control device in communication with the light source and the digital display device to control a change of the solution including the material to form the scaffold or construct.

In some aspects, a high-throughput, maskless fabrication apparatus for using an optical pattern for fabricating scaffolds or tissue constructs directly in a multi-well plate includes a light pattern device including an array of light-emitting diodes (LEDs) with each LED operable to produce a probe light beam and different LEDs being controlled to an array of probe light beams to collectively carry a programmable spatial pattern on the probe light beams, wherein the probe light beams carrying the programmable spatial pattern is projectable on a target surface or chamber that receive the probe light beams from the light pattern device; and a control module coupled to control the light pattern device to direct the probe light beams carrying with the predetermined spatial pattern to the wells to cause photopolymerization of a solution in a well to form a scaffold or tissue construct.

In some aspects, a method for fabricating scaffolds or constructs directly without using a photomask includes emitting a probe light by a light source; spatially-modulating the probe light based on a programmable spatial pattern to produce a pattern-encoded light; and directing the pattern-encoded light carrying the programmable spatial pattern at a target surface or chamber to expose a solution including a material on the target surface or in the target chamber to the encoded light, such that the solution undergoes a change to produce a scaffold or construct.

DETAILED DESCRIPTION

Figure 1A:
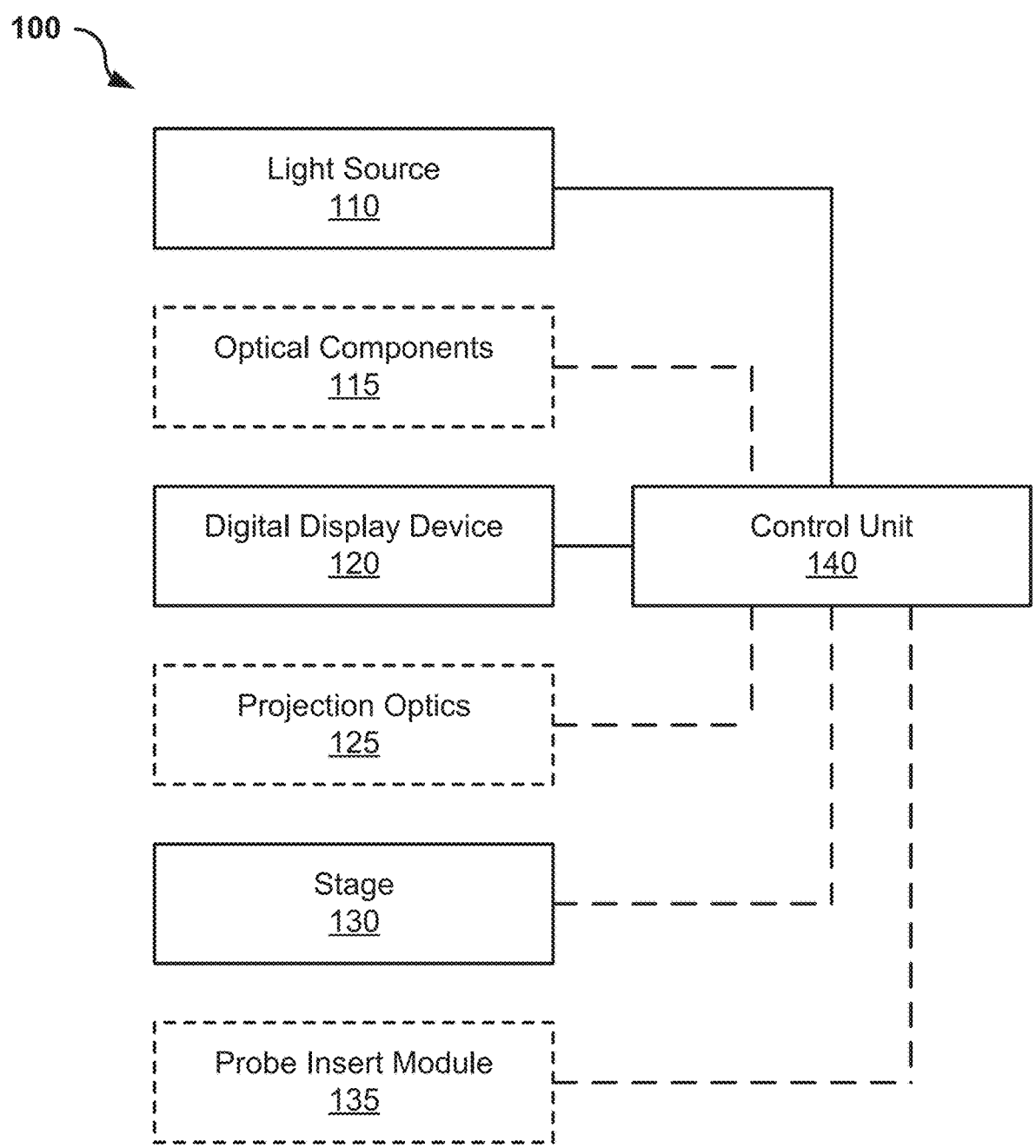
FIG. 1A shows a diagram depicting an example embodiment of a high-throughput, maskless apparatus for fabricating a 3D polymer scaffold and/or an engineered tissue construction a target surface in accordance with the present technology.

Drug development in the pharmaceutical industry is a lengthy, inefficient, and expensive process which limits the throughput of new drugs able to reach the consumer market. Currently, it costs around $1.8 billion over a span of 12-15 years to launch one single drug. According to the FDA, approximately 92% of the drugs that had successfully passed preclinical animal testing failed in subsequent human trials, which highlights the lack of adequate preclinical testing tools to generate accurate predictive data prior. Animal models are costly and have limited predictive value for human metabolism of drugs, e.g., due to the species-specific differences. Traditional in vitro drug testing methods rely on simple 2D cell culture systems, which do not recapitulate the complex 3D tissue microenvironment and therefore lead to unreliable data for predicting in vivo responses. In consequence, there is a significant need for alternative approaches to improve upon drug failure prediction in the early stages that will reduce costs as well as accelerate the innovation and release of new effective drugs.

High throughput screening (HTS) systems offer an efficient method to process large numbers of compounds and molecular targets in a rapid manner. As such, various pharmaceutical companies are turning to the use of 3D biomimetic tissues in HTS format for preclinical toxicity testing of potential drug candidates. In recent years, 3D bioprinting technology has been developed for fabrication of miniaturized 3D cell-laden constructs. For instance, both the inkjet bioprinter and biological laser printer (BioLP) have been used to quickly deposit cells into microarrays.

Yet, various implementations of 3D bioprinting methods are not compatible to print in the multi-well plates which is widely used in the HTS systems for cell/tissue culturing as well as drug response testing. For example, the transferring of the printed samples from these platforms to the multi-well plates significantly slows down the production speed and also increases the risk of disturbing, damaging or contaminating the samples. While certain designs of extrusion-based bioprinters can be modified to print directly in the multi-well plates, these tend to be limited to performing the printing one well after another in a serial manner, which inherently limits the printing speed and takes prolonged time to print large quantities of samples for HTS purpose. This prolonged printing time delays the production and project progress and can induce significant variations in the sample quality, especially when live cells were involved in the printing (e.g., as cell viability can be very different between the first printed sample versus the last printed sample). Thus, there remains an urgent need for a high-throughput fabrication method for direct printing within multi-well cell culture plates for HTS.

Some efforts have been made to enable the simultaneous photopolymerization of hydrogel scaffolds across an entire well-plate using physical photomasks. U.S. Pat. No. 10,073, 346 B2 and U.S. Patent Publication No. 2016/0175800A1 provide examples where a photomask is aligned to the bottom of the well-plates which are filled with photopolymerizable prepolymer solutions. A UV light source projects light through the photomask and selectively polymerizes and forms hydrogels in the wells according to the patterns on the photomasks. In addition, a multi-probe insert that can reach inside the wells were used to control the height of the hydrogel scaffolds to be polymerized. One key limitation with these systems lies in the use of a physical photomask to define the geometry of the hydrogel scaffolds. New photomasks would need to be manufactured to test new designs of the hydrogel scaffold, and often times it will take multiple iterations of trial and error to figure out the optimal design of the photomask. Multiple photomasks will be needed to realize a complex design of the hydrogel scaffolds. The manufacturing of the photomasks is costly, time-consuming and laborious. These issues highlight the lack of flexibility of photomask-based systems. In addition, the sample production and project progress are susceptible to delays caused by the manufacturing of the new photomasks, especially when multiple iterations of designs are needed to optimize the biofabrication of the hydrogel scaffolds and tissue constructs.

To eliminate the use of physical photomasks, digital micromirror devices (DMDs) and liquid crystal displays (LCDs) have been used in some light-based 3D printers to project optical patterns to the bottom of a reservoir from underneath the reservoir. The reservoir was filled with prepolymer solutions for selective polymerization and the polymerized part is constantly lifted up in the vertical direction from the fabrication plane (i.e., the bottom of the reservoir) via a motorized stage to realize the 3D printing of an object via layer-by-layer deposition. Such bottom-up 3D printers are only capable of printing one sample at a time and not compatible with printing in multi-well plates directly. In one example, U.S. Patent Publication No. 2017/0087766A1 to Chung et al. discloses a variation of light-based 3D printer for the direct printing in one well of a multi-well plate. For example, a DMD chip was located above the well-plate and the optical pattern on the DMD was projected from above the multi-well plate through an optically transparent probe into the prepolymer solution in one of the wells in the multi-well plate. The optical probe pushes away the prepolymer solution and the distance between the probe surface and the bottom of the well defines the height of hydrogel scaffolds being printed. The previously printed part of the hydrogel scaffold sticks to the bottom of the well and by moving the plate away from the probe along the direction of light path, 3D printing can be achieved. In this example, hydrogel scaffolds are only printed in one well at a time. To print in all the wells of a multi-well plate, one well is printed after another, scanning across the whole multi-well plate, which would result in prolonged printing time (e.g., similar to the extrusion-based 3D printing technique discuss above) and can require sophisticated system setups (e.g., motorized stage movements in 3D).

Disclosed are methods and apparatuses for high-throughput, maskless fabrication of polymer scaffolds and/or engineered tissue constructs that can be used for cell or tissue culturing to guide cell or tissue behaviors and functions and for drug screening, diagnostics, and therapeutics.

The disclosed technology in this patent document can be implemented in ways that address the above and other technical challenges by providing a maskless high-throughput fabrication method and an apparatus for making 3D polymer scaffolds and biological tissue constructs in multi-well plates using digital display devices. Implementations of the disclosed technology can include a digital display device (e.g. DMDs, LCDs, and LED displays) to control or generate the optical patterns for patterning in fabrication without the use of a physical photomask. The optical patterns are projected to the target wells in a multi-well plate to selectively polymerize and define the shape, the size, and the regional mechanical properties of the polymer scaffolds or biological tissue constructs. Various multi-well plates are compatible with the disclosed method and apparatus and can include, for example, conventional and customized cell/tissue culture vessels with single or a plural number of wells/chambers (e.g., 1, 2, 4, 6, 8, 12, 24, 48, 96, 384, etc.). The disclosed fabrication method and apparatus can be implemented to rapidly perform direct printing of polymer scaffolds and tissue constructs within multiple (e.g., some or all) of the target wells at once, with high scalability, reproducibility, customizability and precise control of the scaffold geometry, the material properties (e.g., stiffness), the cell population and viability, etc. The target wells can be any number or distribution of the wells in the multi-well plate. For example, the direct printing of the polymer scaffolds and/or tissue constructs can occur in part of the well plates, such as half a plate by half, or a quarter by quarter, or the like.

Implementations of the disclosed technology can be used to achieve one or more advantages, including but not limited to: (1) significantly reduce the sample production time for applications that require large quantities of samples (e.g., HTS); (2) reduce variations between repetitive samples and increase the consistency of the testing results by shortening the gap time between the fabrication of the repetitive samples; (3) provide 3D polymer scaffolds and tissue constructs for more realistic and accurate cell/tissue response to replicate the in vivo responses and microenvironments as compared to the traditional 2D culture systems; and/or (4) enable direct in-well printing which reduces or eliminates the transferring and handling procedures, hence eliminating the risk of disturbing, damaging or contaminating the samples.

EXAMPLE EMBODIMENTS

Figure 1B:
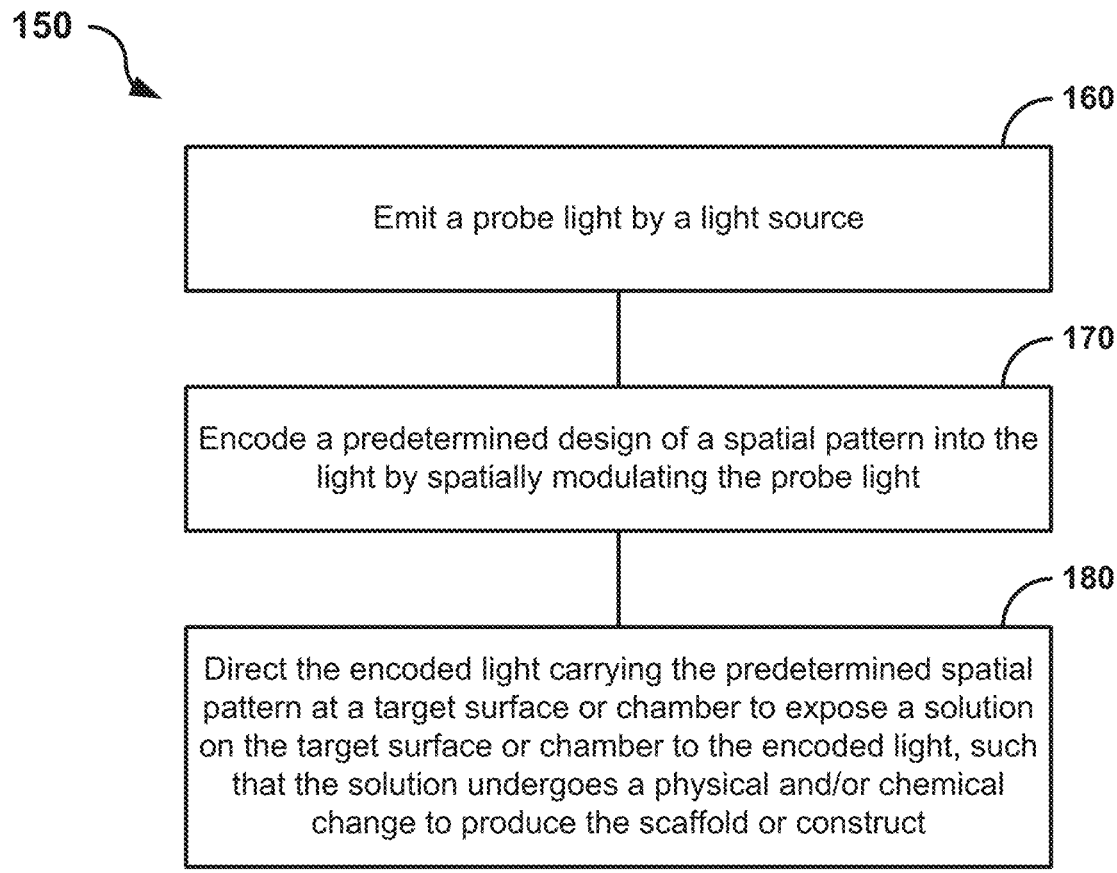
FIG. 1B shows a diagram depicting an example embodiment of a high-throughput, maskless method for fabricating a 3D polymer scaffold and/or an engineered tissue construction a target surface in accordance with the present technology.

Example embodiments of the disclosed fabrication methods and apparatuses for producing 3D polymer scaffolds and biological tissue constructs without a mask and with high-throughput are described. FIGS. 1A and 1B show diagrams depicting an example embodiment of a high-throughput maskless apparatus 100 and method 150, respectively, for fabricating a 3D polymer scaffold and/or an engineered tissue construction a target surface.

As shown in FIG. 1A, the apparatus 100 includes a light source 110 to produce a probe light. The apparatus 100 includes a digital display device 120 that receives the probe light produced by the light source 110 and causes a spatial modulation of the received probe light to produce a programmable spatial pattern of the probe light projectable on a surface. The digital display device 120 is configured such that the spatial pattern is in a predetermined or predesigned pattern. In some example embodiments of the apparatus 100, the digital display device 120 includes a digital micromirror device (DMD), a liquid crystal display (LCD), or a light-emitting diode (LED) display. In some implementations, for example, the digital display device 120 can serve as the light source 110 and the device to create the spatial pattern to spatially module the emitted light.

The apparatus 100 includes a stage 130 to hold a target surface or chamber, on which is a solution containing a material or materials that will form a scaffold or construct based on interaction with the probe light controllably projected at the solution. In some example embodiments of the apparatus 100, the stage 130 includes a motorized stage to hold the target surface or chamber and to move the target surface or chamber to a particular plane for projection of the spatially-modulated light carrying the predetermined spatial pattern. In some implementations, for example, the digital display device 120 can serve as a platform (e.g., a stage) to hold the target surface or chamber receiving the light modified (modulated) by the digital display device 120.

The apparatus 100 includes a control unit 140 coupled to control the light source 110 and the digital display device 120 to control the light source 110 to control the direction of the spatially-modulated light carrying the predetermined spatial pattern at the target surface or chamber placed on the stage 130 to cause a physical and/or chemical change of the solution on the target surface or chamber to form a scaffold or construct.

In various implementations, for example, the scaffold or construct produced by the apparatus 100 is a 3D polymer scaffold or an engineered construct for a biological tissue produced by photopolymerization of a polymer material contained in the solution. For example, by control of the digital display device 120, the apparatus 100 is operable to produce optical patterns in the probe light generated by the light source 110 that are projected to the target surface or chamber (e.g., standard multi-well plate) to selectively polymerize and define the shape, size, and regional mechanical properties of a polymer scaffold or biological tissue construct. In various examples, materials of the solution on the target surface or chamber for the fabrication a polymer scaffold or biological tissue construct can include, but not limited to, photopolymerizable monomer solutions, photoinitiators, cells, nanoparticles, and other biomolecules.

FIG. 1B shows a diagram of an example embodiment of the method 150 for producing a scaffold or construct with high-throughput and without using a photomask. The method 150 can be implemented by various example embodiments of the apparatus 100. As shown in the diagram of FIG. 1B, the method 150 includes a process 160 to emit a probe light by a light source. The method 150 includes a process 170 to encode a predetermined design of a spatial pattern into the light by spatially modulating the probe light. The method 150 includes a process 180 to direct the encoded light carrying the predetermined spatial pattern at a target surface or chamber, e.g., one or more wells of a multi-well plate, to expose a solution on the target surface or in the target chamber to the encoded light, such that the solution undergoes a physical and/or chemical change to produce the scaffold or construct. For example, the process 180 can direct the encoded light at the one or more wells of the multi-well plate to expose solutions contained in the different wells to cause photopolymerization of each solution in the respective well to form the polymer scaffold or tissue construct.

In some embodiments, the method 150 optionally includes a process 190 (not shown) to apply an insert with different probes that are designed to spatially correspond to the different wells of the multi-well plate, respectively, to, after filling the wells with the solutions, to direct the probes into the wells to control a volume in each well. In some embodiments, the method 150 optionally includes a process to place one or more solutions in the target surface or chamber, e.g., prior to implementing the processes 160, 170, 180, to control a volume of a solution on the target surface or in the target chamber (e.g., different wells of a multi-well plate, respectively).

In some implementations of the apparatus 100 and method 150, for example, the target surface or chamber on which a 3D polymer scaffold and/or engineered tissue construct is fabricated can include a standard, conventional multi-well plate, e.g., which can be used to produce cell/tissue culture vessels within at least a portion of a single well or a plurality wells of the multi-well plate.

In some implementations of the apparatus and method 150, for example, the thickness of the polymer structure formed on the target surface or chamber can be controlled by controlling the volume of monomer solution added to the target surface or chamber. For example, in a multi-well plate, a variety of polymer scaffolds or tissue constructs can be created in different well plates by varying the volume of monomer solutions added to each well.

In some implementations of the apparatus 100 and method 150, for example, the target surface or chamber (e.g., bottom(s) of the well(s) of a multi-well plate) are pre-treated for improved adhesion of the fabricated polymerized structures to the target surface.

In some implementations of the apparatus and method 150, for example, a side wall of one or more wells of the well plate can be configured to have specially-designed physical features to reduce or eliminate the meniscus formed between the liquid solution surface and the side wall of the well. For example, in some implementations, the surface of the side wall can alternatively or additionally be chemically treated to reduce the meniscus, e.g., with hydrophobic or superhydrophobic coatings. The physical features and the chemical coatings can be combined for optimal reduction or elimination of the meniscus.

In some implementations of the apparatus 100 and method 150, for example, the multi-well plate can be mounted on the example motorized stage 130 that moves in the projection direction of the optical patterns (e.g., perpendicular to the multi-well plate plane), which enables the focused optical pattern to scan through the prepolymer solution in the target wells to fabricate 3D constructs.

In some embodiments of the apparatus 100, for example, the apparatus 100 optionally includes one or more optical components 115, e.g., such as lenses, diffusers and/or a homogenizer, that can be used to collimate and/or expand the light emitted by the light source 110 to the digital display device 120. In some implementations, the optical components 115 can be used to evenly distribute the light intensity of the emitted light.

In some embodiments of the apparatus 100, for example, the apparatus 100 optionally includes a projection optical module 125 positioned between the digital display device 120 and the stage 130 to receive and manipulate the projection the spatially-modulated light carrying the predetermined spatial pattern on the target surface or chamber set on the stage 130.

In some embodiments of the apparatus 100, for example, the apparatus 100 optionally includes a probe insert module 135 configured to be placed at the target surface or chamber, in which the probe insert module 135 is used to control the surface of the polymer scaffolds or tissue construct to be formed. In some embodiments, the probe insert module 135 includes a multi-probe insert having different probes that are designed to spatially correspond to the different wells of a multi-well plate, respectively. For example, the multi-probe insert can be used to control the thickness of a polymerized structure. In some embodiments, for example, the probe insert module 135 can include a spacer for additional control of the height of the polymer scaffold to be formed.

In some implementations, the example high-throughput, maskless fabrication apparatus 100 is configured to produce a 3D scaffold or biological tissue construct in multi-well plates using one or more digital display devices 120 (e.g., DMDs, LCDs, and LED displays) to control the photopolymerization process in the wells of the multi-well plate. For example, the one or more digital display devices 120 (e.g., DMDs, LCDs, and LED displays) control or generate the projection of optical patterns on the bottom of the multi-well plate for selective photopolymerization. In some embodiments, the apparatus 100 employs optical systems for collimation of the light from the light source 110 and/or the projection optics 125 for assisting in projection of the light carrying the predetermined spatial pattern spatially-modulated by the one or more digital display devices 120 to the fabrication plane of the target surface or chamber placed on the stage 130. The optical patterns can be dynamically uploaded, controlled, and changed via the control unit 140, e.g., which can include a computer connected to the one or more digital display devices 120.

Advantageously, for example, the control unit 140 can be configured to only need digital files for production of the spatial pattern, therefore eliminating the need of a physical photomask. In various examples, the digital files can be derived from computer-aided designs (CADs), computed tomography (CT) scans, magnetic resonance imaging (MRI) scans, and other 3D models or 2D patterns. The optical patterns are projected to the target surface(s) or chamber(s) (e.g., wells of the multi-well plate) to selectively polymerize and define the shape, the size, and the regional mechanical properties of the polymer scaffolds or biological tissue constructs. The target wells can be any number or distribution of the wells in the multi-well plate, e.g., including but not limited to e.g. 1, 2, 4, 6, 8, 12, 24, 48, 96, 384, etc.

One exemplary implementation of the maskless, high-throughput fabrication apparatus in accordance with the disclosed technology includes (i) a light source, (ii) a digital display device (where, in some embodiments, the digital display device additionally or alternatively serves as the light source), (iii) optical lenses (optionally used in some embodiments), (iv) a stage (where, in some embodiments, the stage is a motorized stage) that holds the target surface(s) or chamber(s) such as a multi-well plate, (v) a multi-probe insert (optionally employed in some embodiments to control surface of the polymer scaffolds, which, in some embodiments, the multi-probe insert is employed with a spacer for additional control of the polymer scaffolds' height), (vi) a housing enclosure that holds and aligns the above parts, prevent the light from leaking out and potentially provide a sterile biofabrication environment, and (vii) a control unit, which can be embodied on a computer system, to control the operation and the above components.

Light Source

The light source 110 can include a suitable light source emitting light that can initiate photopolymerization of a prepolymer solution mixed with the appropriate photoinitiator. The wavelength of the light emitted by the light source 110 can range from UV light to visible light, and in some implementations, the wavelength of the light emitted by the light source 110 can range even further to near infrared light. The physical parameters of the light emitted by the light source 110, such as light intensity, exposure time and wavelength, are controlled by the control unit 140 in communication with the light source 110. In some embodiments, the light source 110 includes one or more of mercury lamps, LEDs, and LED arrays suitable for the implementation of the apparatus 100 and method 150.

In one example embodiment, an LED display emitting the light at a particular wavelength (e.g., 365 nm or 405 nm) can take two roles, e.g., acting as both the light source 110 and the digital display device 120 to modulate the optical patterns projected to the surface or chamber on the stage (e.g., wells of a multi-well plate). Optical components such as lenses, diffusers and homogenizer can be used in the apparatus 100 to collimate and expand the light from a single mercury lamp as well as provide even distribution of light intensity. Optical components such as lenses, apertures, mirrors can be used in the apparatus 100 to project the optical patterns from the digital display device(s) 120 to the target surface or chamber on the stage 130 (e.g., wells of the multi-well plate).

Digital Display Device

The digital display device 120 serves as the light modulator to generate optical patterns which are projected to the target surface or chamber, e.g., which can be project on the entire or just a part of the target surface or chamber, such as the entire or part of the bottom of the multi-well plates. The light modulation provided by the digital display device 120 enables the selective photopolymerization of a prepolymer solution in each targeted well, for example. The optical patterns generated on the digital display device 120 are controlled by the control unit 140, e.g., a computer. The control unit 140 controls the physical parameters of each pixel on these digital displays, such as light "on" or "off", light intensity, exposure time, and wavelength, to generate dynamic optical patterns for photopolymerization. Suitable digital display devices include digital micromirror array devices (DMDs), liquid crystal displays (LCDs), light-emitting diode (LED) displays.

In some embodiments, the digital display device 120 can include one or more DMD chips. A DMD chip can include an array of millions of reflective micromirrors (e.g., 1920× 1080, 2560×1600) and each micromirror can be controlled by the computer to be "on" or "off" at any moment. For example, the light from the light source is only reflected by the "on" micromirrors and projected through the projection lenses to the multi-well plate for polymerization. The micromirrors can also be rapidly switched between the "on" and "off" states to create a grey pixel and the switching frequency can be controlled by the computer to create different grey values which can be employed to achieve different light exposure intensities at each pixel, and thus leading to different degrees of localized crosslinking densities and material properties (e.g. stiffness and porosity) of the polymerized structures.

In some embodiments, the digital display device 120 can include one or more LCDs. LCDs employ the light-modulating properties of the liquid crystals to generate the optical patterns. In contrast to the reflective micromirrors on a DMD chip, for example, the liquid crystal pixels on LCDs can be individually controlled to dictate how much light can pass through them. LCDs do not emit light by themselves, therefore require a light source (a.k.a. "backlight") to produce the optical pattern for photopolymerization. The light source can be LEDs, electroluminescent panels (ELPs), cold cathode fluorescent lamps (CCFLs), hot cathode fluorescent lamps (HCFLs), external electrode fluorescent lamps (EEFLs), incandescent lightbulbs, or other backlight source, for example. Optical components, such as diffusers and lenses, can be employed to provide even lighting from an uneven source to the LCDs. By taking advantage of the LCD technology, the apparatus 100 can significantly lower the cost of a fabrication based on the disclosed technology.

In some embodiments, the digital display device 120 can include one or more LEDs. In contrast to LCDs and DMDs, for example, LED displays can emit light on their own, thus eliminating the need of a dedicated light source. LED displays use an array of LEDs as pixels for the display of optical patterns (i.e. images or videos). Each pixel of the LED display is an individual LED and can be controlled individually in terms of light intensity, exposure time and wavelength, thus generating dynamic optical patterns for photopolymerization. Suitable LED display devices for this purpose can also include, but are not limited to, microLEDs, active-matrix organic light-emitting diodes (AMOLEDs or OLEDs) and quantum-dot light-emitting diodes (QLEDs). By taking advantage of the emerging LED display technologies, the performance of the fabrication apparatus 100 (e.g., printing resolution and reproducibility) can be greatly improved, and the cost can be reduced.

Multi-Well Plates

As discussed above, the apparatus 100 and the method 150 can produce the scaffold or construct in wells of standard or customized multi-well plates. Herein, multi-well plates broadly refer to various cell/tissue culture vessels, including, e.g., the conventional and customized cell/tissue culture vessels with single or a plural number of wells/chambers (e.g. 1, 2, 4, 6, 8, 12, 24, 48, 96, 384, etc.), which researchers are familiar with and can be used with their current lab facilities, such as cell/tissue culturing incubators, imaging microscopes, and HTS systems. In various implementations, the multi-well plates providing the target surface or chamber can include, but are not limited to, glass-bottom multi-well plates (e.g., MatTek glass bottom multi-well culture plates, Nunc™ 384-Well Optical Bottom Plates with coverglass bottom, Greiner Sensoplate™ glass bottom multiwell plates); regular non-glass bottom multi-well plates (e.g., Corning® Costar® TC-Treated Multiple Well Plates, Corning® 96 Well TC-Treated Microplates, Nunc™ 384-Well Optical Bottom Plates with polymer bottom); chamber slide systems (e.g., Nunc® Lab-Tek™ II Chamber Slide™ System); glass-bottom petri dishes (e.g., MatTek glass bottom dishes, Nunc™ Glass Bottom Dishes, Ibidi® Glass Bottom Dishes); and non-glass bottom petri dishes (e.g., Nunc™ EasYDish™ Dishes). In some implementations, holders or adapters are designed to fit the various designs of the multi-well plates and make them interchangeable in using or implementing the fabrication apparatus 100.

In some implementations, the bottoms of the wells can be chemically treated for improved adhesion of the polymerized constructs to the bottoms. For instance, the inner glass bottom surface of the multi-well plates can be functionalized with methacrylate group, which can form covalent bonds with the polymer scaffolds or tissue constructs. In some implementations, the glass bottom surface can also be functionalized with active thiol groups to serve the same purpose.

In implementations, for example, the preferred material for the well walls should not be optically transparent to the wavelength of the light for initiating photopolymerization, in order to prevent the light interference between the neighboring wells (e.g., prevent undesired photopolymerization caused by the light leaked from the neighboring wells).

In some implementations, the side walls of the wells can be functionalized with hydrophobic coating materials, e.g., such as silicone, fluoropolymer, EPDM, buna nitrile, and/or petroleum jelly, to reduce or eliminate the meniscus formed by the prepolymer solution in the wells.

In addition to the conventional multi-well plates with smooth side walls, customized multi-well plates are also contemplated to have physical textures such as a step edge to alter the contact angle and reduce the meniscus. Some examples of customized multi-well plates having physical textures to assist in altering contact angle and reducing the meniscus that can be used by the example embodiments of the apparatus 100 are described in U.S. Pat. No. 9,261,454 B2, which is incorporated by reference as part of this patent disclosure for all purposes.

Furthermore, the coating and the physical textures can be combined for use in the same wells to achieve optimal reduction of the meniscus. Some examples of this that can be used by the example embodiments of the apparatus 100 and method 150 are described in U.S. Pat. No. 9,931,633 B2, which is incorporated by reference as part of this patent disclosure for all purposes.

For example, by controlling the liquid volume added into each well, the apparatus 100 can control the height of the prepolymer solution and thus control the thickness of the printed polymer scaffolds or tissue constructs.

Multi-Probe Insert

In some embodiments of the apparatus 100 and the method 150, a technique to eliminate the meniscus and control the thickness of the polymerized structure includes using a multi-probe insert that can reach inside the wells. Some examples of a multi-probe insert that can be used in accordance with example embodiments of the apparatus 100 and method 150 are described in U.S. Patent Publication No. 2016/0175800A1 and U.S. Pat. No. 10,073,346 B2, which are incorporated by reference as part of this patent disclosure for all purposes.

In some examples, the multi-probe insert pushes the excess prepolymer aside to the space between the probe and the side wall of the well. The bottom surface of the probes in contact with the prepolymer solution can be smooth or have physical textures to mold the polymer with additional geometrical features. The surface of the probe needs to be coated or composed of hydrophobic materials (e.g., silicone, fluoropolymer, etc.) for easy separation from the printed polymer scaffolds. The probes on the same multi-probe insert can feature different sizes, lengths and shapes. The multi-probe insert will go from the top of an open well plate so that the probes can reach inside the multi-well plate. A spacer can be added in between the multi-probe insert and the multi-well plate to provide additional control of the distance between the probe surface and the well bottom (e.g., the height of the polymerization region). The spacer can be coupled with an actuator that provides dynamic control of the spacing distance.

Motorized Stage

As discussed above, in some embodiments, the stage 130 includes a motorized stage that can control movement of the target surface or chamber containing the solution in multiple directions (e.g., x, y, and z axes). For example, a multi-well plate can be mounted on a motorized stage that moves in the projection direction of the optical patterns (e.g., perpendicular to the multi-well plate plane), which enables the focused optical pattern to scan through the prepolymer solution in the targeted wells to fabricate 3D constructs. During a 3D scaffold or construct fabrication process (e.g., implementation of the method 150), the initial optical pattern can first be focused on the bottom of the targeted wells. The example motorized stage 130 moves the multi-well plate towards the digital display device 120 (where the optical pattern is generated) along the direction of light beam, so that the focal plane of the following optical patterns can be moved through a preset height of the prepolymer solution in the target wells to create 3D constructs.

Holder/Housing Unit

In some embodiments, for example, the apparatus 100 includes a holder or housing unit to hold and align the components of the apparatus 100. For example, the holder or housing can be used to align the light source 110, the optional optical components 115, and the digital display device 120 (and, e.g., the optional projection optics 125). The holder or housing can also ensure the stage positioning the target surface or chamber (e.g., multi-well plate) is located in the appropriate position, e.g., so that the optical pattern can be projected to the bottom of the target wells for optimal polymerization. Also, for example, the holder or housing can ensure the example multi-probe insert fits in the appropriate position relative to the multi-well plate.

In some embodiments, for example, the holder or housing is configured as an enclosure that blocks the light from leaking out, which can protect the operator of the apparatus 100 from undesired light exposure. In some implementations, the apparatus 100 can be fully enclosed with biological safety grade materials to keep the internal space sterile and reduce the risk of contamination.

Computer and Controller System

The controllable instruments of the apparatus 100 are connected to and/or embedded with a computing system, which can be centrally controlled by the control unit 140. The control unit 140 can be embodied on a computer to control the light source 110 (e.g., control light exposure intensity and time, wavelength), to control the digital display device 120 (e.g., control the individual pixels, and to control the example motorized stage 130 (e.g., control positioning of the target surface or chamber in a particular plane). In implementations including the multi-probe insert, for example, the control unit 140 can be configured to control the spacer/actuator. In example advanced versions of the apparatus 100, the instrument can also be equipped with sensors to detect and check if the parts are in the proper settings and positions. In such embodiments, the sensors are connected to the control unit 140 (e.g., computer system) to report errors or confirm the operation of the apparatus 100.

Figure 1C:
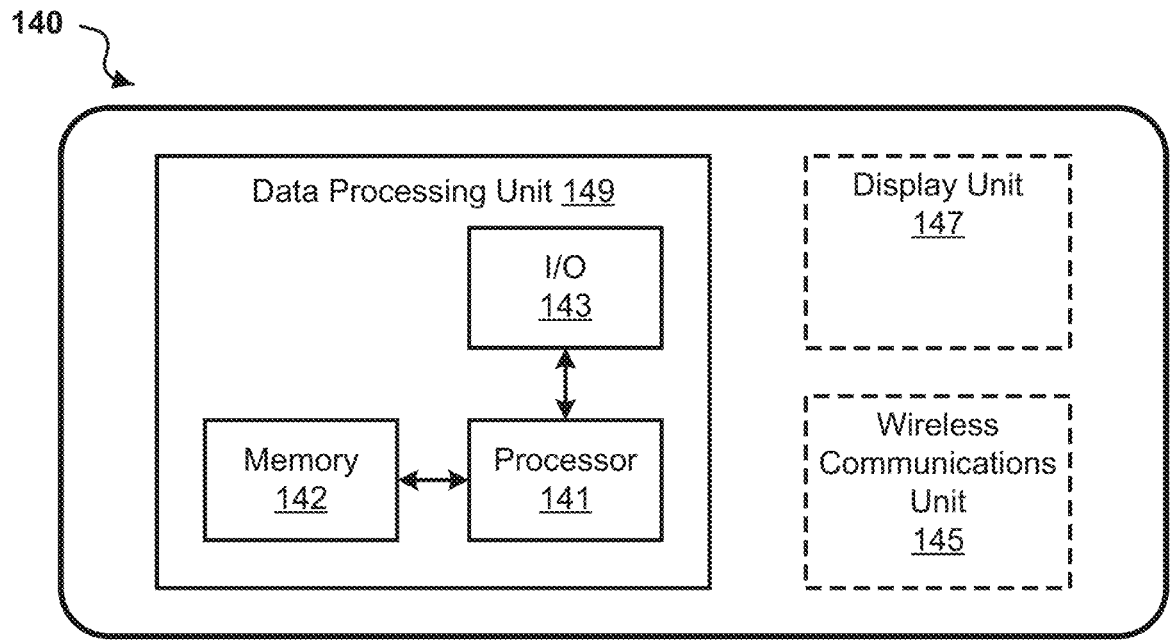
FIG. 1C shows a block diagram of an example embodiment of a control unit of the apparatus of FIG. 1A.

FIG. 1C shows a block diagram of an example embodiment of the control unit 140, which can electrically interface to the components of the apparatus 100 for various implementations. For example, in various implementations, the control unit 140 is operable to store and execute software applications to implement various fabrication protocol algorithms and/or implement various functionalities of the high-throughput, maskless fabrication apparatus 100.

In various implementations, the control unit 140 can be implemented as a portable signal processing and/or computing device, which can include a mobile communications device, such as a smartphone, tablet or wearable device, like a smartwatch, smartglasses, etc.; and/or, the control unit 140 can be implemented as a stationary signal processing and/or computing device, such as a desktop or laptop computer. In some embodiments, the control unit 140 includes a dongle that couples to the light source 110, the digital display device 120 and/or the stage 130 to wirelessly connect to computing components (e.g., a data processing unit) of the control unit 140.

The control unit 140 includes a data processing unit 149 includes a processor 141 to process data, a memory 142 in communication with the processor 141 to store data, and an input/output unit (I/O) 143 to interface the processor 141 and/or memory 142 to other modules, units or devices, including other external computing devices. For example, the processor 141 can include a central processing unit (CPU) or a microcontroller unit (MCU). For example, the memory 142 can include and store processor-executable code, which when executed by the processor, configures the data processing unit 149 to perform various operations, e.g., such as receiving information, commands, and/or data, processing information and data, and transmitting or providing information/data to another device. In some implementations, the data processing unit 149 can transmit raw or processed data to a computer system or communication network accessible via the Internet (referred to as 'the cloud') that includes one or more remote computational processing devices (e.g., servers in the cloud). To support various functions of the data processing unit 149, the memory 142 can store information and data, such as instructions, software, values, images, and other data processed or referenced by the processor. For example, various types of Random Access Memory (RAM) devices, Read Only Memory (ROM) devices, Flash Memory devices, and other suitable storage media can be used to implement storage functions of the memory 142.

In some embodiments, the control unit 140 optionally includes a wireless communication unit 145, such as a wireless transmitter to transmit stored and/or processed data or a wireless transceiver (Tx/Rx) to transmit and receive data. The I/O 143 of the data processing unit 149 can interface the data processing unit 149 with the wireless communications unit 145 to utilize various types of wired or wireless interfaces compatible with typical data communication standards, for example, which can be used in communications of the data processing unit 149 with the components of the apparatus 100 and/or other devices, via a wireless transmitter/receiver (Tx/Rx) unit, e.g., including, but not limited to, Bluetooth, Bluetooth low energy, Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE/5G cellular communication methods, NFC (Near Field Communication), and parallel interfaces.

In some embodiments, the control unit 140 optionally includes a display unit 147, which can include a visual display such as a display screen, an audio display such as a speaker, or other type of display or combinations thereof. The I/O 143 of the data processing unit 149 can also interface with other external interfaces, sources of data storage, and/or visual or audio display devices, etc. to retrieve and transfer data and information that can be processed by the processor 141, stored in the memory 142, or exhibited on an output unit (e.g., display unit 147) of the control unit 140 or an external device. For example, the display unit 147 can be configured to be in data communication with the data processing unit 149, e.g., via the I/O 143, to provide a visual display, an audio display, and/or other sensory display that produces the user interface of the software application. In some examples, the display unit 147 can include various types of screen displays, speakers, or printing interfaces, e.g., including but not limited to, light emitting diode (LED), or liquid crystal display (LCD) monitor or screen, cathode ray tube (CRT) as a visual display; audio signal transducer apparatuses as an audio display; and/or toner, liquid inkjet, solid ink, dye sublimation, inkless (e.g., such as thermal or UV) printing apparatuses, etc.

Example Embodiments of the Apparatus 100

Example 1: DMD+Multi-Probe Insert+Motorized Stage

Figure 1D:
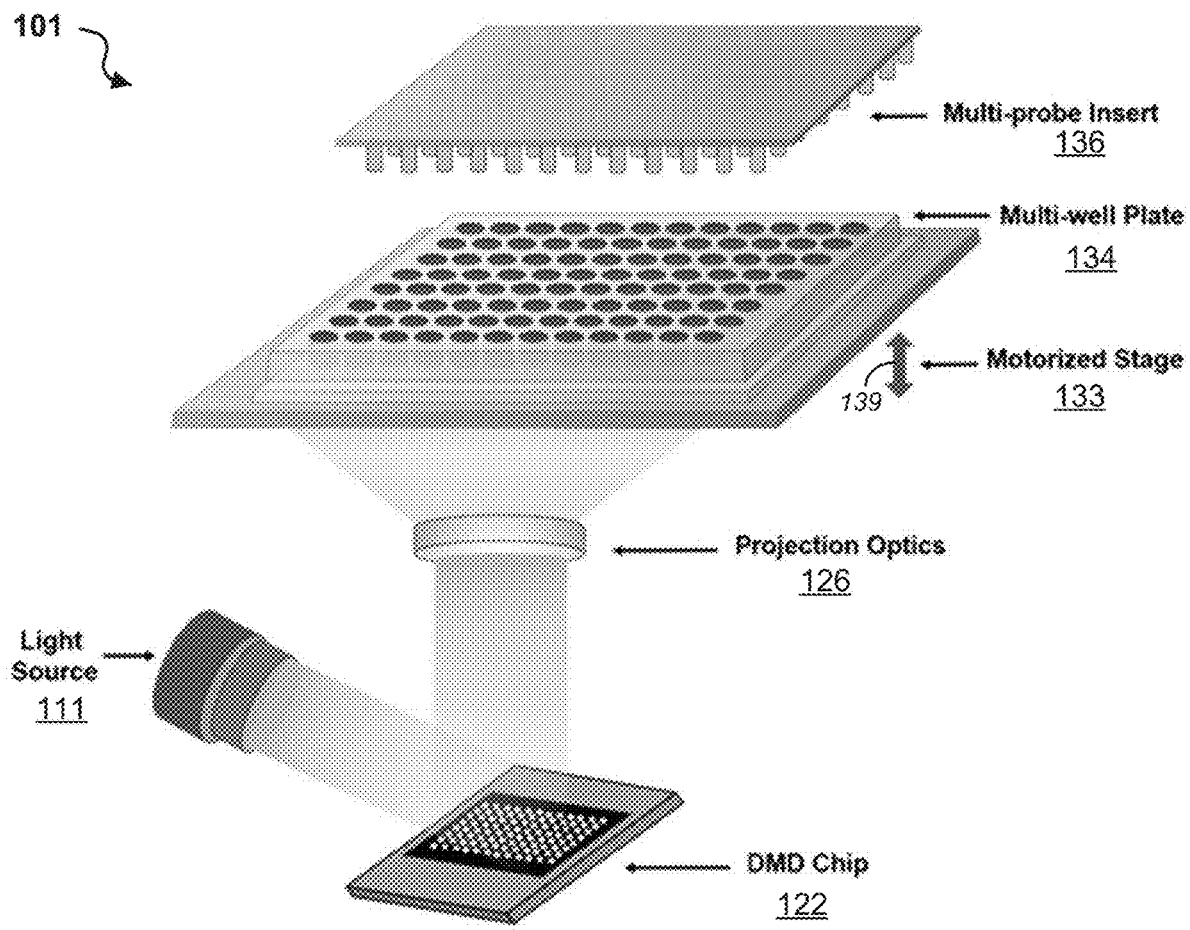
FIGS. 1D-1F show diagrams depicting an example embodiment of a high-throughput, maskless fabrication apparatus in accordance with the apparatus of FIG. 1A, which uses a DMD as the digital display device.
Figure 1E:
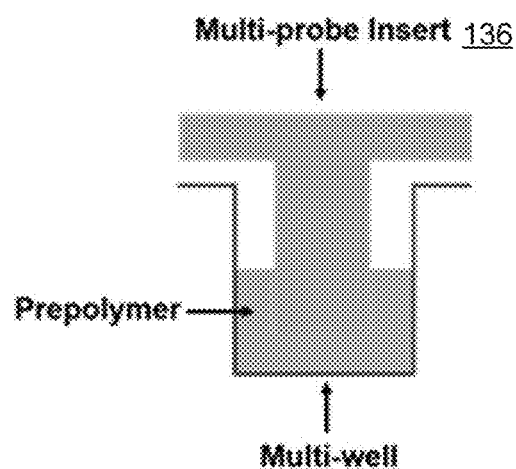
Figure 1F:
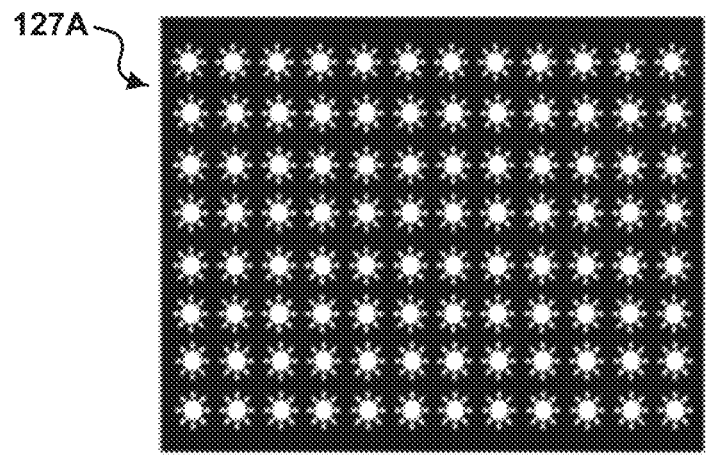
Figure 1F:
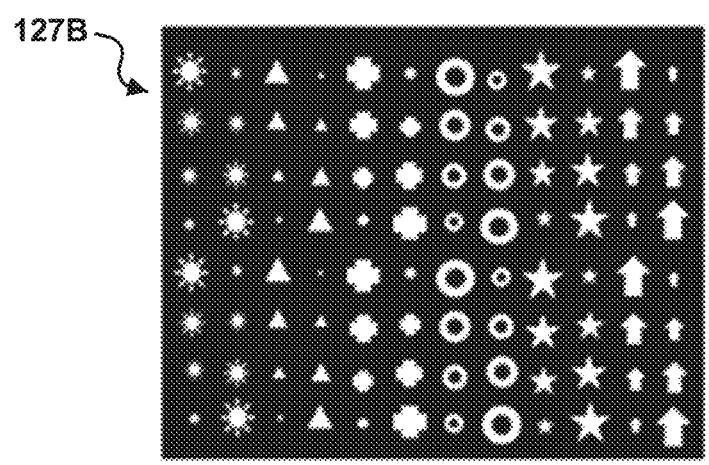
Figure 1F:
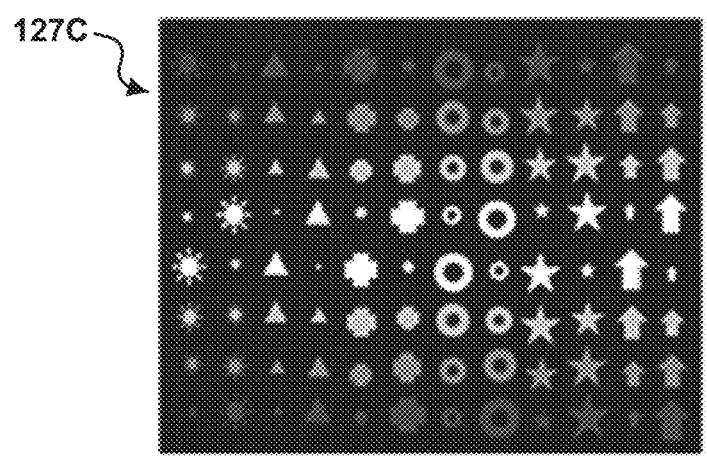

FIGS. 1D-1F show an example embodiment (Example 1) of a high-throughput, maskless fabrication apparatus 101 in accordance with the apparatus 100 that uses a DMD as the digital display device 120. As shown in FIG. 1D, the apparatus 101 includes a light source 111, a DMD chip 122, and a motorized stage 133. The apparatus 101 includes the control unit 140, e.g., which can be embodied by a computer device in communication with the light source 111, the DMD chip 122, and the motorized stage 133.

The light source 111 can include any light source emitting light that can initiate photopolymerization of a prepolymer solution mixed with the appropriate photoinitiator. For example, the wavelength of the light emitted by the light source 111 can range from UV to visible light and even further to near infrared light. The physical parameters of the light source 111, such as light intensity, exposure time and wavelength, are controlled by a computer (not shown) connected to the light source 111. In some embodiments, the light source 111 includes one or more of a mercury lamp, LEDs, or an LED array. The light from the light source 111 can be collimated and projected to a DMD chip 122 by optics component (not shown). The light reflected by the DMD chip 122 is projected to the bottom of targeted wells in a multi-well plate 134, positioned on the motorized stage 133, where the DMD chip 122 spatially modulates the light to project the predefined optical patterns on the target plane of the wells in the multi-well plate 134. In implementations, for example, only the micromirrors at the "on" state will reflect the light towards the multi-well plate 134 for selective photopolymerization. In the example embodiment of the apparatus 101, projection optics 126 can be used to expand and project the spatially-modulated light from the DMD chip 122 onto the bottom of the targeted wells in the multi-well plate 134 positioned on the motorized stage 133. The motorized stage 133 can be used to provide dynamic scanning of the optical pattern through the prepolymer solution in the wells of the multi-well plate 134 for 3D fabrication.

The optical pattern on the DMD chip 122 can be controlled by the digital files uploaded by the computer; thus, for example, a printing process is digitalized. The digital files can be derived from any 3D models or 2D image files, such as computer-aided designs (CADs), computed tomography (CT) scans, and magnetic resonance imaging (MRI) scans.

In some implementations, the multi-well plate 134 is mounted on the motorized stage 133 which can move in the directions perpendicular to the multi-well plate plane (indicated by the arrows 139). The light from the light source is reflected by the "on" pixels of the DMD chip (e.g., white features shown in the example patterns 127A, 127B, 127C in FIG. 1F) and projected to cover the part of or the entire multi-well plate (i.e., the target wells) for photopolymerization.

FIG. 1E shows an example embodiment of a multi-probe insert 136 that can be implemented in the example embodiment of the apparatus 101. The multi-probe insert can be used to control the height of the prepolymer solution in the wells of the multi-well plate 134, and hence can control the height of the polymerized structure. For example, the multi-probe insert 136 can be used to eliminate the meniscus and control the height of the prepolymer solution for the fabrication. The probes can reach inside the multi-well plate 134. In implementations, for example, the probe pushes away the prepolymer solution and leaves a gap with the desired height of prepolymer for polymerization.

FIG. 1F shows an optical pattern 127A with an array of same design for each well, an optical pattern 127B with an array of various designs (shapes and dimensions), and an optical pattern 127C with an array of various designs and various gray scale values. As illustrated in FIG. 1F, the optical pattern can be readily changed due to the digitalized nature of the process. Such changes of the optical patterns include the shape and the size of the patterns as well as the grey-scale value of the individual pixels. For example, the optical pattern 127A and 127B demonstrate the flexibility to change the design (shape and dimension) across the same panel of the optical pattern. Also, for example, by switching the individual micromirrors rapidly at various frequencies, the apparatus 101 can also control the grey-scale value of each pixel which defines the light exposure from each pixel, as shown by the example pattern 127C, thus controlling the local crosslinking density and material properties of the polymerized structures.

In some implementations, for example, to operate the apparatus 101, the target wells in the multi-well plate 134 are first filled with the appropriate amount of prepolymer solution. Secondly, the multi-probe insert 136 is mounted onto the multi-well plate 134 to control the prepolymer liquid height. The multi-well plate 134 is mounted on the motorized stage 133. The desired optical patterns are uploaded to the DMD chip 122 by the computer. The computer also controls the light source 111 and the motorized stage 133. When the polymer scaffold or construct fabrication method using the apparatus 101 is to begin, the optical pattern is first focused on the bottom of the target wells in the multi-well plate 134. For dynamic 3D fabrication, for example, the motorized stage 133 can move the multi-well plate 134 along the direction of the light so that the optical patterns can scan through the desired height of the prepolymer to induce selective photopolymerization and fabricate 3D structures. After the fabrication, the multi-probe insert 136 is removed from the multi-well plate 134 and the produced 3D structures may stay in the multi-well plate 134. To fabricate multi-material structures, for example, the unpolymerized part of the first prepolymer solution would be removed at this step, and a second prepolymer solution can be added to the target wells afterwards. The same multi-probe insert 136 (for the same height control) or a different multi-probe insert 136' (for a different height control) can be mounted onto the multi-well plate 134 again to control the height of the new prepolymer solution. The DMD chip 122 is then loaded, by the computer, with the new optical pattern designs for the fabrication of the new structure parts in addition to the first 3D structure. This process can be repeated to fabricate multi-material structures. After the fabrication is finished, the multi-well plate 134 with the 3D fabricated samples is then removed from the motorized stage 133 and can be used for follow-up studies, such as imaging, incubation, testing drugs or assays, etc.

The fabrication apparatus 101 described above with reference to FIG. 1D is one example embodiment of the disclosed high-throughput, maskless fabrication apparatuses for fabricating scaffolds or constructs, which can be directly in a multi-well plate. In the example of FIG. 1D, the apparatus 101 includes the light source 111, a digital display device (as a DMD chip 122), a projection optical module (as projection optics 126), the motorized stage 133 to position the multi-well plate 134, the optional multi-probe insert 136, and a control module, which may include a computer. In some embodiments, the apparatus 101 includes a housing enclosure to hold and align the parts and orient the optical pattern to the multi-well plate 134. The light source 111 can be operated to emit light that can initiate photopolymerization of a prepolymer solution mixed with the appropriate photoinitiator and the wavelength of the suitable light can range, in some applications, from UV to visible light and even further to near infrared light. The apparatus 101 includes the DMD chip 122, which generates the optical patterns in the light, which via the projection optical module (projection optics 126) can be operated to project and focus the optical pattern from the DMD chip 122 to the multi-well plate 134. The motorized stage 133 can be controlled to move the multi-well plate 134 along the direction of the light path to allow the optical patterns to scan through the prepolymer solution for 3D fabrication. The control module (e.g., a computer) can be used to control various components, including the light source 111, the DMD chip 122, and the motorized stage 133. In some implementations, the control module can be used to provide the dynamic control of the light intensity, the exposure time and/or the optical wavelength of the light source, the optical patterns on the DMD chip 122, as well as the motion of the motorized stage 133 to enable dynamic 3D fabrication in the multi-well plate 134. The multi-probe insert 136 can be structured to eliminate, minimize or significantly reduce the meniscus of the prepolymer solution and controls the height of the prepolymer solution for the 3D fabrication. The probes on the multi-probe insert 136 may be designed to have different lengths and sizes in some implementations. The multi-well plate 134 can be designed to have a range of different numbers of wells/chambers in different applications, e.g. 1, 2, 4, 6, 8, 12, 24, 48, 96, 384, etc.

The fabrication of polymer scaffolds or tissue constructs directly in a multi-well plate 134 may use one single prepolymer solution for fabricating a homogeneous structure, or multiple materials added sequentially to the multi-well plate to fabricate multi-material heterogeneous structures. The material used for fabrication can include, but are not limited to, photopolymerizable monomer solutions, photoinitiators, cells, nanoparticles, and other biomolecules.

Figure 1G:
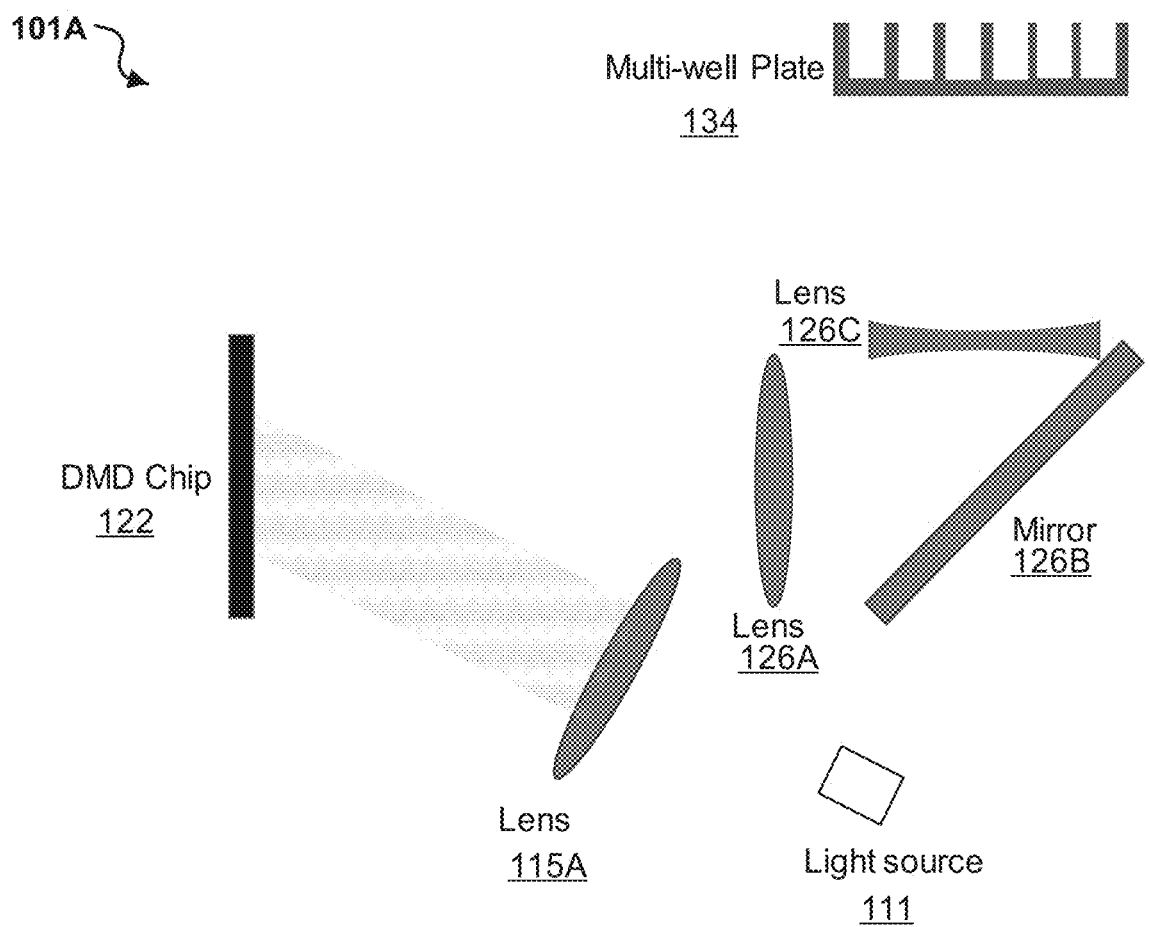
FIG. 1G shows an example embodiment of a high-throughput, maskless fabrication apparatus in accordance with the apparatus shown in FIG. 1D.

FIG. 1G shows an example embodiment of a high-throughput, maskless fabrication apparatus 101A in accordance with the apparatus 101 shown in FIG. 1D. As shown in FIG. 1G, in this example, the apparatus 101A includes the light source 111, the DMD chip 122, and an example embodiment of the optional one or more optical components 115, which includes a lens 115A. The apparatus 101A includes the stage 130 (not shown) to hold the multi-well plate 134, and the control unit 140 (not shown), e.g., which can be embodied by a computer device in communication with the light source 111, the DMD chip 122, and the stage 133, e.g., motorized stage. The apparatus 101A features an example embodiment of the projection optics 126. In this example, the projection optics includes a first lens 126A, a mirror 126B, and a second lens 126C. The first lens 126A is positioned in the light path to receive the spatially-modulated light from the DMD chip 122 to focus the light on the mirror 126B to be reflected upon the second lens 126C that projects the spatially-modulated light upon the target surface or chamber, e.g., the multi-well plate 134. The example embodiment shown in FIG. 1G illustrates the first lens 126A as a convex lens, and the second lens 126C as a concave lens. It is understood that other optical configurations of the optional projection optics 126 can be used in the apparatus 101A, as well as other embodiments of the apparatus 100.

Example 2: DMD+Multi-Probe Insert−Motorized Stage

Figure 2:
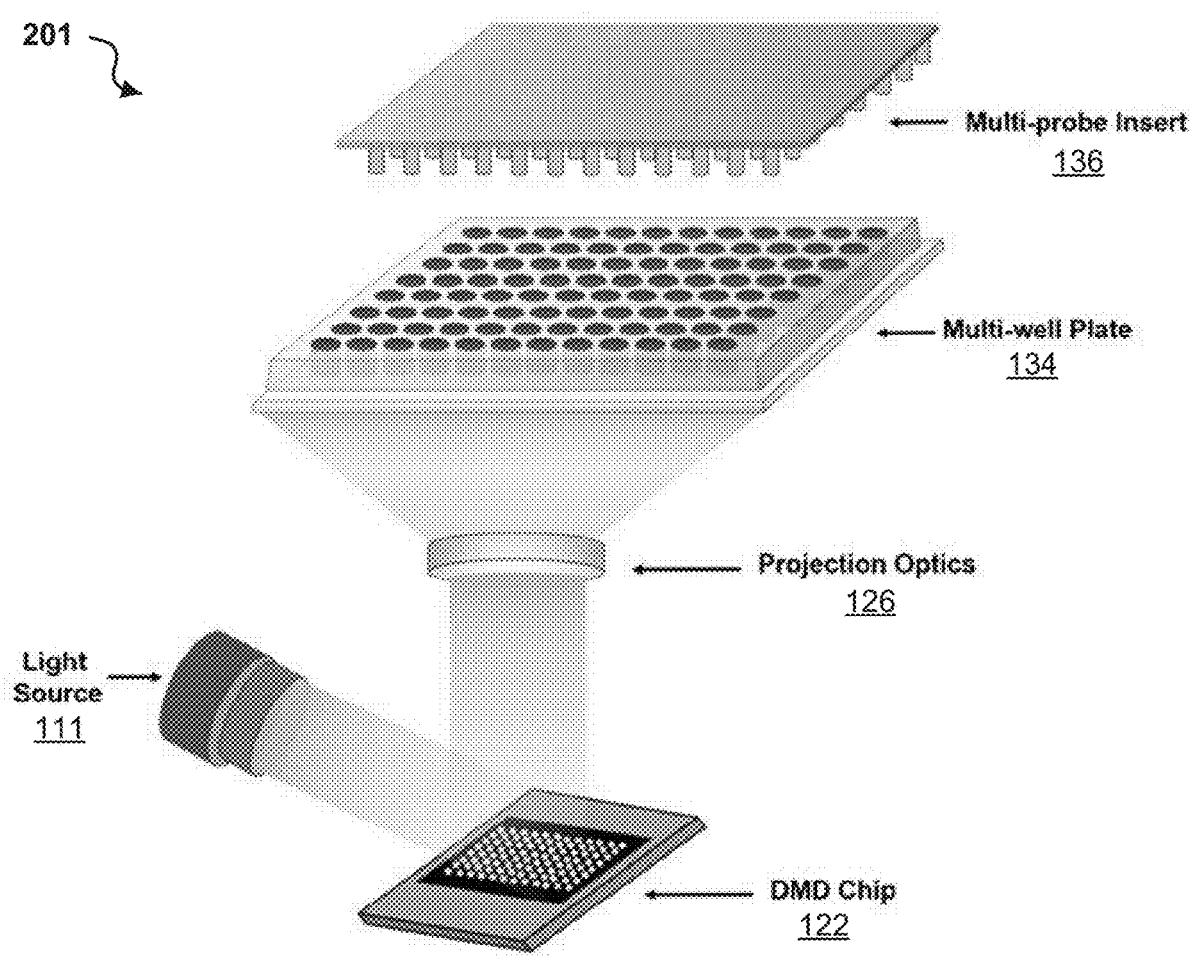
FIG. 2 shows a diagram depicting an example embodiment of a high-throughput, maskless fabrication apparatus in accordance with the apparatus of FIG. 1A, which uses a DMD as the digital display device without a motorized stage.

FIG. 2 shows an example embodiment (Example 2) of a high-throughput, maskless fabrication apparatus 201 in accordance with the apparatus 100 that uses a DMD as the digital display device 120, but does not include a motorized stage. The apparatus 201 in Example 2 is a derivative of the example embodiment of the apparatus 101 in Example 1, but without the motorized stage 133 in the apparatus 201 of the Example 2. Therefore, in Example 2, the focal plane of the optical patterns is preset to be at one location of the multi-well plate 134 (e.g. the bottom of the target wells). The apparatus 201 can be used for fabricating relatively simple structures which do not require design changes along the direction of the light path. The operation procedure is similar to Example 1, except there is no dynamic control of the motorized stage.

Example 3: DMD+Liquid Volume Control+Motorized Stage

Figure 3A:
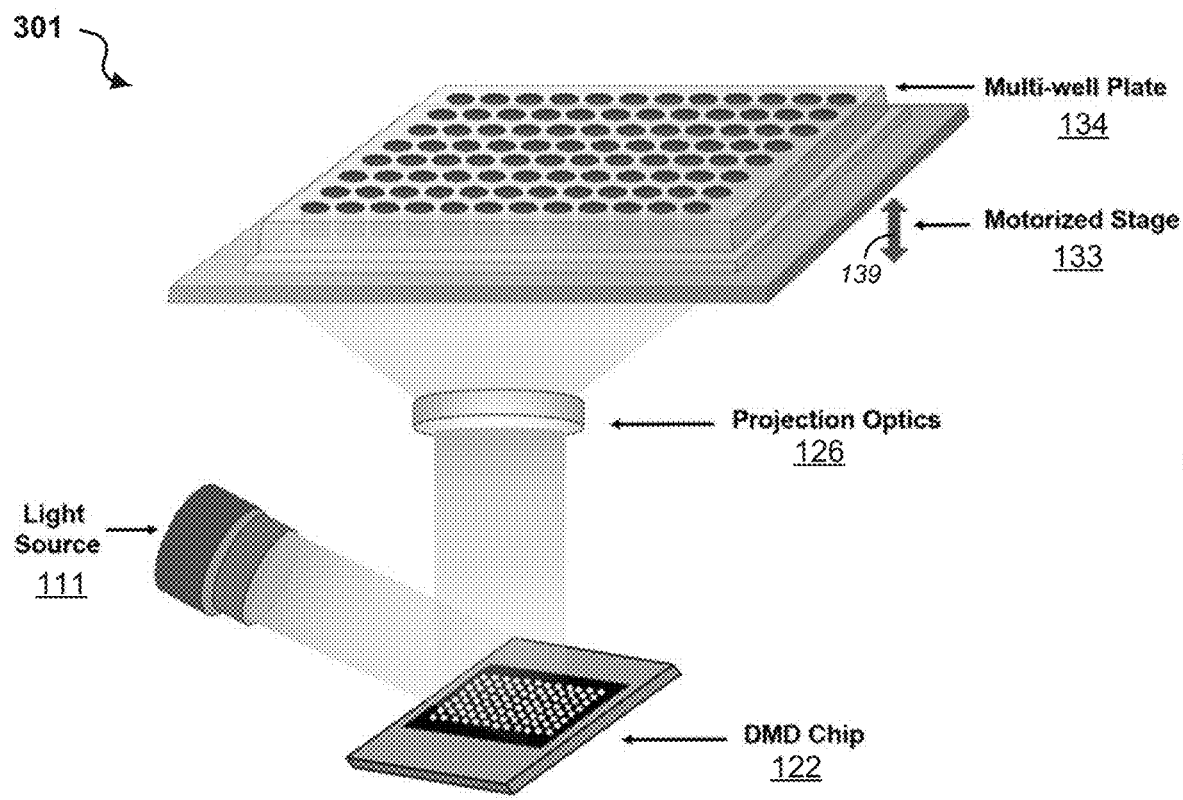
FIGS. 3A-3C show diagrams depicting an example embodiment of a high-throughput, maskless fabrication apparatus in accordance with the apparatus of FIG. 1A, which uses a DMD as the digital display device without a multi-probe insert.
Figure 3B:
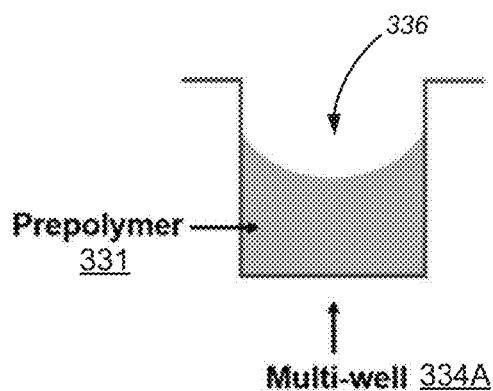
Figure 3C:
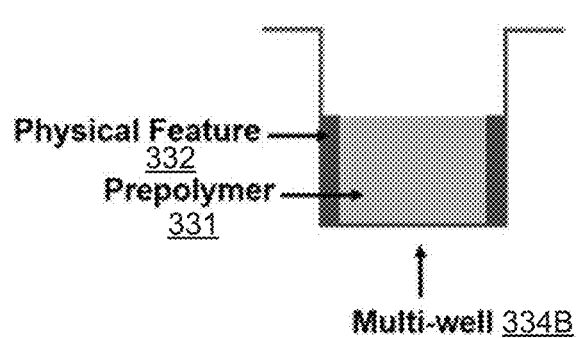

FIGS. 3A-3C show an example embodiment (Example 3) of a high-throughput, maskless fabrication apparatus 301 in accordance with the apparatus 100 that uses a DMD as the digital display device 120, but does not include a multi-probe insert. The apparatus 301 in Example 3 is a derivative of the example embodiment of the apparatus 101 in Example 1, where the apparatus 301 of the Example 3 controls the polymerized structure height by controlling the liquid volume without the use of a multi-probe insert 136. The height of the prepolymer solution in each well is directly related to the volume of the prepolymer solution added into the well. For example, the motorized stage 133 of the apparatus 301 can be used to provide dynamic scanning of the optical pattern through the prepolymer solution for 3D fabrication.

FIGS. 3B and 3C show diagrams illustrating example variations that use the multi-well plates 134. The diagram of FIG. 3B shows a zoom-in cross-sectional view of one regular well 334A of the multi-well plate 134 filled with prepolymer solution 331. The meniscus 336 is formed near the sidewall of the well 334A at the surface of the liquid. The liquid height is controlled by the volume filled into each well. The diagram of FIG. 3C shows a zoom-in cross-sectional view of a customized or modified well 334B filled with prepolymer solution 331. The sidewall of the modified well 334B has a physical feature (e.g., a step feature) which eliminates the meniscus. The diagram of FIG. 3C shows a variation that uses the specially-modified well 334B of the multi-well plate 134 having the physical feature 332 on the side wall (e.g., step edge) of the well 334B to reduce or eliminate the meniscus. In both variations of FIGS. 3B and 3C, the sidewall surface can be further coated with a coating material (e.g., hydrophobic or super-hydrophobic coatings, such as silicone, fluoropolymer, fluorinated coatings, EPDM, buna nitrile, and/or petroleum jelly) to further reduce or eliminate the meniscus.

In an example operation of the fabrication apparatus 301, the target wells (e.g., wells 334A and/or wells 334B) in the multi-well plate 133 are first filled with the appropriate amount of prepolymer solution. The volume of the prepolymer solution in each well is precisely controlled to provide the desired the prepolymer liquid height. The multi-well plate 134 is mounted on the motorized stage 133. The desired optical patterns are uploaded to the DMD chip 122 by the computer. The computer also controls the light source 111. The optical pattern is focused on the bottom of the target wells in the multi-well plate 134. To fabricate multi-material structures, the unpolymerized part of the first prepolymer solution will be removed at this step, and the second prepolymer solution can be added to the target wells afterwards. The volume of the second prepolymer solution is precisely controlled to control the height of the new prepolymer solution. The DMD chip 122 is then loaded with the new optical pattern designs for the fabrication of the new structure parts in addition to the first 3D structure. This process can be repeated to fabricate multi-material structures. After the fabrication is finished, the multi-well plate 134 with the 3D fabricated samples is then removed from the motorized stage 133 and can be used for follow-up studies, such as imaging, incubation, testing drugs or assays, etc.

The fabrication apparatus 301 described above with reference to FIG. 3A may include various ancillary features as in the example embodiments of the apparatus 101 and 201. For example, a housing enclosure can be provided to align the parts and orient the optical pattern to the multi-well plate 134. The multi-well plate 134 can be regular multi-well plates without physical or chemical surface modification on the well walls, and can be customized with physical features (e.g., physical features 332) on the side wall (e.g., step edge) to reduce or eliminate the meniscus. In some implementations, for example, the sidewall surface of the multi-well plate 134 can be coated with a coating material (e.g., hydrophobic or super-hydrophobic coatings, such as silicone, fluoropolymer, fluorinated coatings, EPDM, buna nitrile, and/or petroleum jelly) to reduce or eliminate the meniscus.

Example 4: DMD+Liquid Volume Control−Motorized Stage

Figure 4:
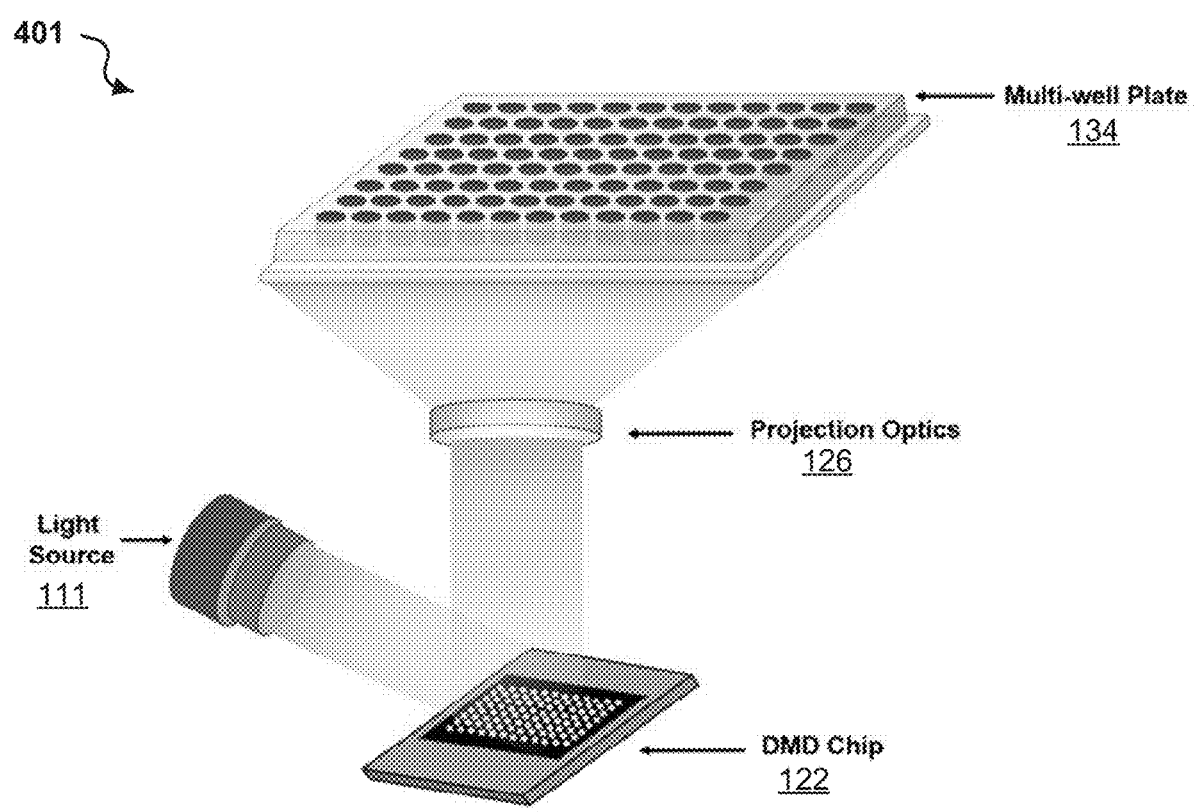
FIG. 4 shows a diagram depicting an example embodiment of a high-throughput, maskless fabrication apparatus in accordance with the apparatus of FIG. 1A, which uses a DMD as the digital display device without a multi-probe insert and motorized stage.

FIG. 4 shows an example embodiment (Example 4) of a high-throughput, maskless fabrication apparatus 401 in accordance with the apparatus 100 that uses a DMD as the digital display device 120, but does not include a multi-probe insert and does not include a motorized stage. The apparatus 401 in Example 4 is a derivative of the example embodiment of the apparatus 301 in Example 3, but without the motorized stage 133 in the apparatus 301 of the Example 3. Therefore, in Example 4, the focal plane of the optical patterns is preset to be at one location of the multi-well plate 134 (e.g. the bottom of the target wells). The apparatus 401 can be used for fabricating relatively simple structures which do not require design changes along the direction of the light path. The operation procedure is similar to Examples 1 and 3, except there is no dynamic control of the motorized stage.

Example 5: LCD+Multi-Probe Insert

Figure 5A:
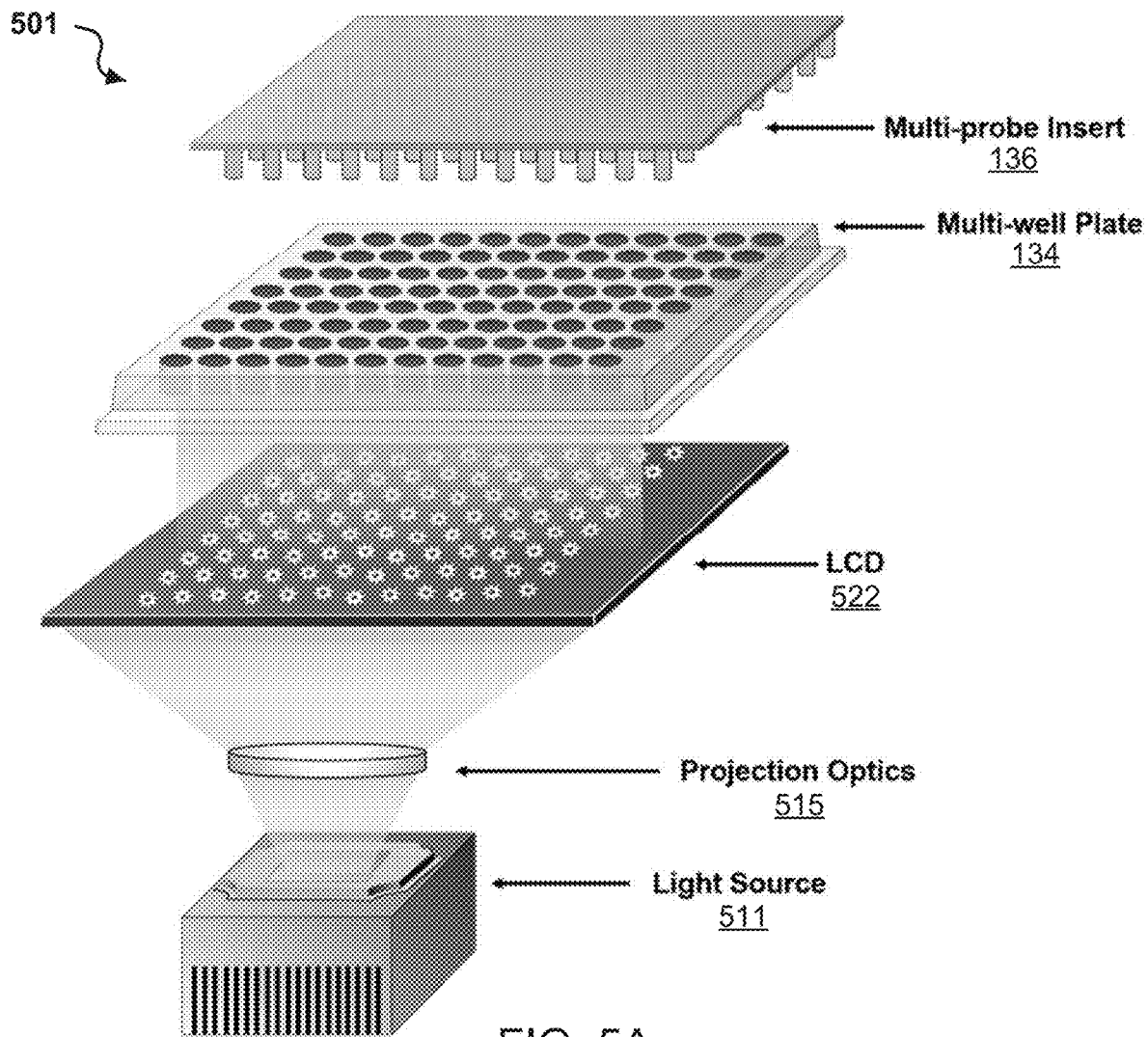
FIGS. 5A-5C show diagrams depicting an example embodiment of a high-throughput, maskless fabrication apparatus in accordance with the apparatus of FIG. 1A, which uses a LCD as the digital display device.
Figure 5B:
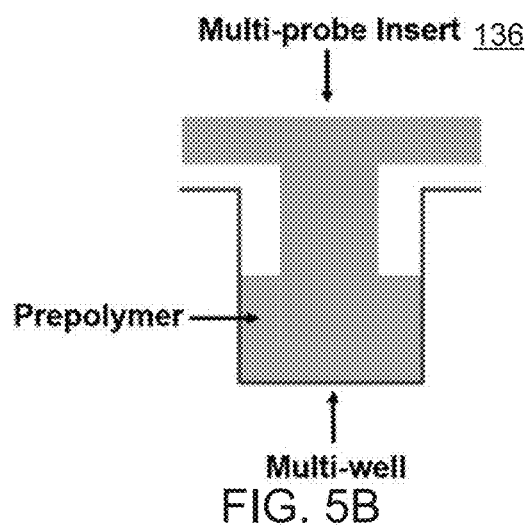
Figure 5C:
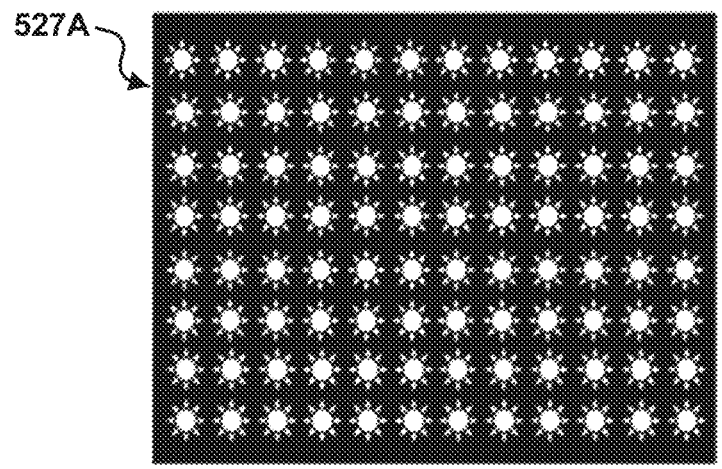
Figure 5C:
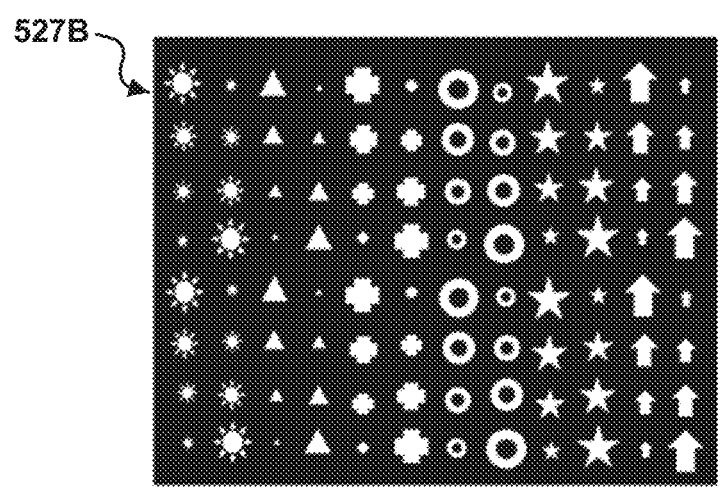
Figure 5C:
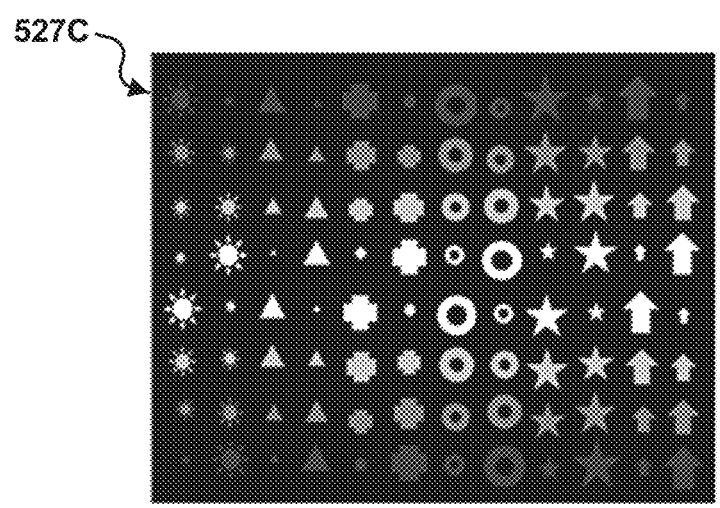

FIGS. 5A-5C show an example embodiment (Example 5) of a high-throughput, maskless fabrication apparatus 501 in accordance with the apparatus 100 that uses a LCD as the digital display device 120. As shown in FIG. 5A, the apparatus 501 includes a light source 511 and an LCD 522. The apparatus 501 includes the control unit 140, e.g., which can be embodied by a computer device in communication with the light source 511 and the LCD 522, which can serve as the platform (e.g., stage) to place the multi-well plate 134 for receiving the modulated light projected by the LCD 522 for selective polymerization of the solution in the wells of the multi-well plate 134 to produce the 3D scaffold or construct. In some embodiments of the apparatus 501, like that illustrated in FIG. 5A, the apparatus 501 includes projection optics 515 to expand and direct the probe light emitted by the light source 511 on the LCD 522. In some example embodiments, the optional projection optics 515 can include a lens or lenses, such as one or more convex lenses and/or one or more concave lenses, to controllably direct the light from the light source 511 on the LCD 522.

The optical pattern that is "filtered" (modulated) by the LCD 522 is projected to the bottom of the multi-well plate 134 for selective polymerization. The optical pattern on the LCD 522 can be controlled by the digital files uploaded by the computer; and thus, the printing process is digitalized. The digital files can be derived from any 3D models/files, such as computer-aided design (CAD), computed tomography (CT) scans, and magnetic resonance imaging (MRI) scans.

FIG. 5B shows an example embodiment of the multi-probe insert 136 that can be implemented in the example embodiment of the apparatus 501. The multi-probe insert 136 can be used to control the height of the prepolymer solution in the wells of the multi-well plate 134, and hence can control the height of the polymerized structure. For example, the multi-probe insert 136 can be used to eliminate the meniscus and control the height of the prepolymer solution for the fabrication. The probes can reach inside the multi-well plate 134. In implementations, for example, the probe pushes away the prepolymer solution and leaves a gap with the desired height of prepolymer for polymerization.

FIG. 5C shows an optical pattern 527A with an array of same design for each well, an optical pattern 527B with an array of various designs (shapes and dimensions), and an optical pattern 527C with an array of various designs and various gray scale values. As illustrated in FIG. 5C, the optical pattern producible by LCD 522 can be readily changed due to the digitalized nature of the process. Such changes of the optical patterns include the shape and the size of the patterns as well as the grey-scale value of the individual pixels. For example, the optical pattern 527A and 527B demonstrate the flexibility to change the design (shape and dimension) across the same panel of the optical pattern. Also, for example, switching the orientation of the liquid crystals of each pixel, the apparatus 501 can also control the grey-scale value of each pixel which defines the light exposure from each pixel, as shown by the example pattern 527C, thus controlling the local crosslinking density and material properties of the polymerized structures.

In some implementations, for example, to operate the apparatus 501, the target wells in the multi-well plate 134 are first filled with the appropriate amount of prepolymer solution. Secondly, the multi-probe insert 136 is mounted onto the multi-well plate 134 to control the prepolymer liquid height. The multi-well plate is mounted above the LCD 522. The desired optical patterns are uploaded to the LCD 522 by the computer. The computer also controls the light source 511. When the polymer scaffold or construct fabrication method using the apparatus 501 is to begin, the optical pattern is focused on the bottom of the target wells in the multi-well plate 134. After the fabrication, the multi-probe insert 136 is removed from the multi-well plate 134 and the produced 3D structures may stay in the multi-well plate 134. To fabricate multi-material structures, for example, the unpolymerized part of the first prepolymer solution would be removed at this step, and the second prepolymer solution can be added to the target wells afterwards. The same multi-probe insert 136 (for the same height control) or a different multi-probe insert 136' (for a different height control) can be mounted onto the multi-well plate 134 again to control the height of the new prepolymer solution. The LCD 522 is then loaded, by the computer, with the new optical pattern designs for the fabrication of the new structure parts in addition to the first 3D structure. This process can be repeated to fabricate multi-material structures. After the fabrication is finished, the multi-well plate 134 with the 3D fabricated samples can be used for follow-up studies, such as imaging, incubation, testing drugs or assays, etc.

Example 6: LCD+Liquid Volume Control

Figure 6A:
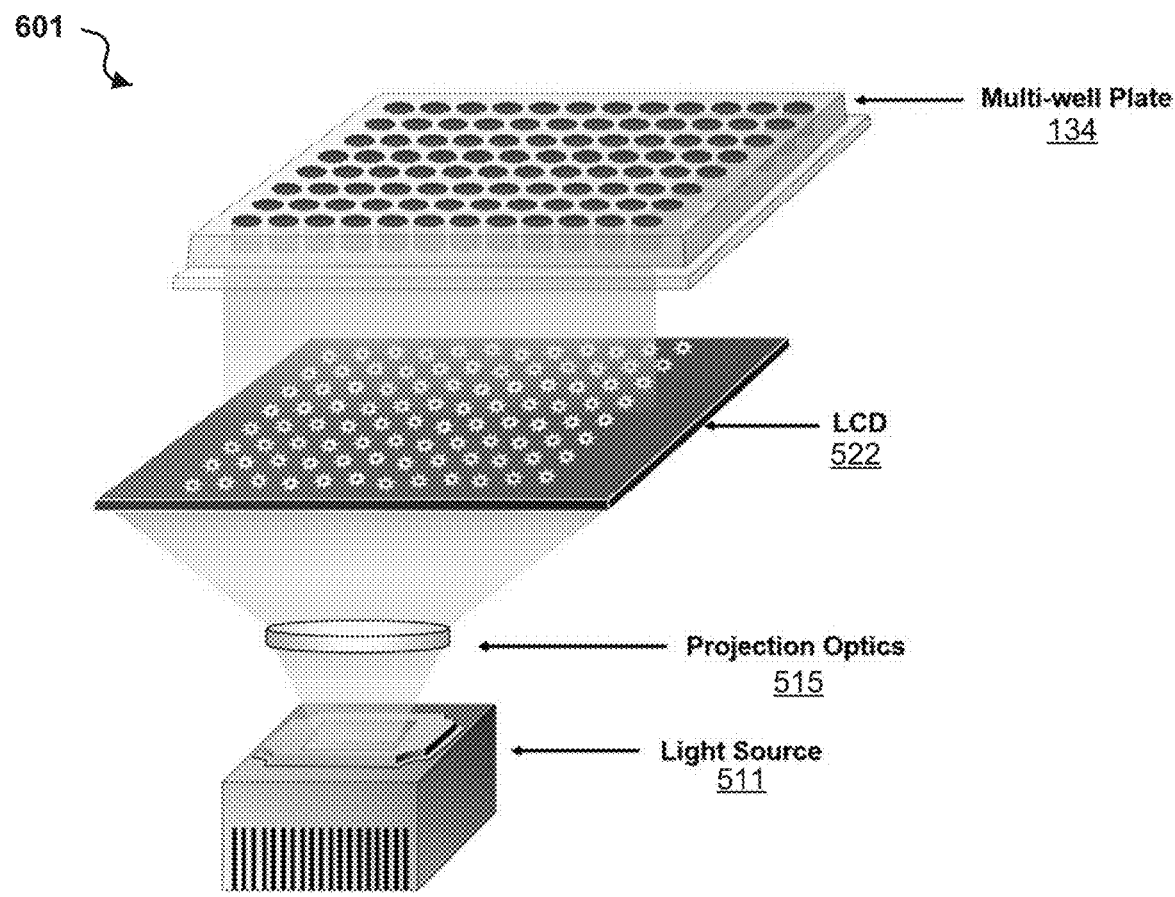
FIGS. 6A-6C show diagrams depicting an example embodiment of a high-throughput, maskless fabrication apparatus in accordance with the apparatus of FIG. 1A, which uses a LCD as the digital display device, but does not include a multi-probe insert.
Figure 6B:
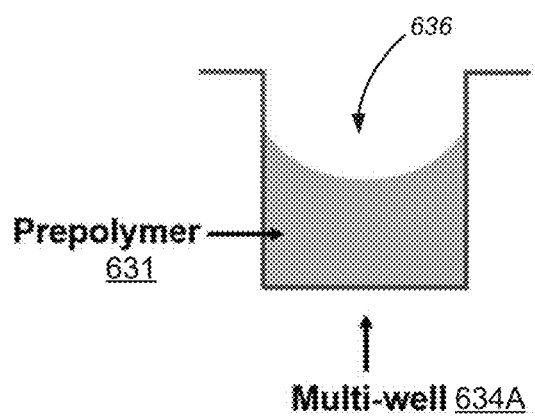
Figure 6C:
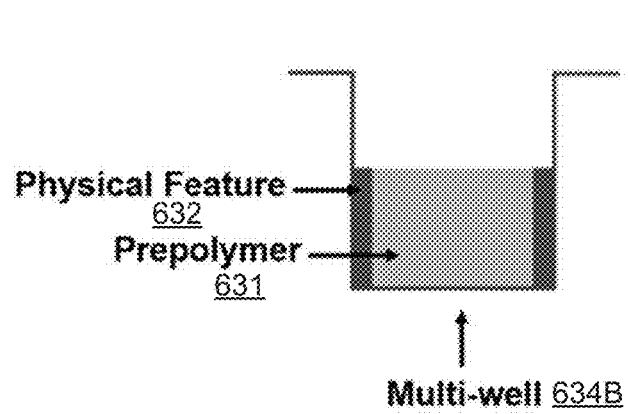

FIGS. 6A-6C show an example embodiment (Example 6) of a high-throughput, maskless fabrication apparatus 601 in accordance with the apparatus 100 that uses a LCD as the digital display device 120, but does not include a multi-probe insert and does not include a motorized stage. The apparatus 601 in Example 6 is a derivative of the example embodiment of the apparatus 501 in Example 5, where the polymerized structure height is controlled by controlling the liquid volume without the use of the multi-probe insert 136. The height of the prepolymer solution in each well of the multi-well plate 134 is directly related to the volume of the prepolymer solution added into the well.

FIGS. 6B and 6C show diagrams illustrating example variations that use the multi-well plates 134. The diagram of FIG. 6B shows a zoom-in cross-sectional view of one regular well 634A of the multi-well plate 134 filled with prepolymer solution 631. The meniscus 636 is formed near the sidewall of the well 634A at the surface of the liquid. The liquid height is controlled by the volume filled into each well. The diagram of FIG. 6C shows a zoom-in cross-sectional view of a customized or modified well 634B filled with prepolymer solution 631. The sidewall of the modified well 634B has a physical feature (e.g., a step feature) which eliminates the meniscus. The diagram of FIG. 6C shows a variation that uses the specially-modified well 634B of the multi-well plate 134 having the physical feature 632 on the side wall (e.g., step edge) of the well 634B to reduce or eliminate the meniscus. In both variations of FIGS. 6B and 6C, the sidewall surface can be further coated with a coating material (e.g., hydrophobic or super-hydrophobic coatings, such as silicone, fluoropolymer, fluorinated coatings, EPDM, buna nitrile, and/or petroleum jelly) to further reduce or eliminate the meniscus.

In some implementations to operate the apparatus 601, for example, the target wells in the multi-well plate 134 are first filled with the appropriate amount of prepolymer solution. The volume of the prepolymer solution in each well is precisely controlled to provide the desired the prepolymer liquid height. The multi-well plate 134 is mounted above the LCD 522. The desired optical patterns are uploaded to the LCD 522 by the computer. The computer also controls the light source 511. The optical pattern is focused on the bottom of the target wells in the multi-well plate 134. To fabricate multi-material structures, for example, the unpolymerized part of the first prepolymer solution can be removed at this step, and the second prepolymer solution can be added to the target wells afterwards. The volume of the second prepolymer solution is precisely controlled to control the height of the new prepolymer solution. The LCD 522 is then loaded with the new optical pattern designs for the fabrication of the new structure parts in addition to the first 3D structure. This process can be repeated to fabricate multi-material structures. After the fabrication is finished, the multi-well plate 134 with the 3D fabricated samples can be used for follow-up studies, such as imaging, incubation, testing drugs or assays, etc.

Example 7: LED Display+Multi-Probe Insert

Figure 7A:
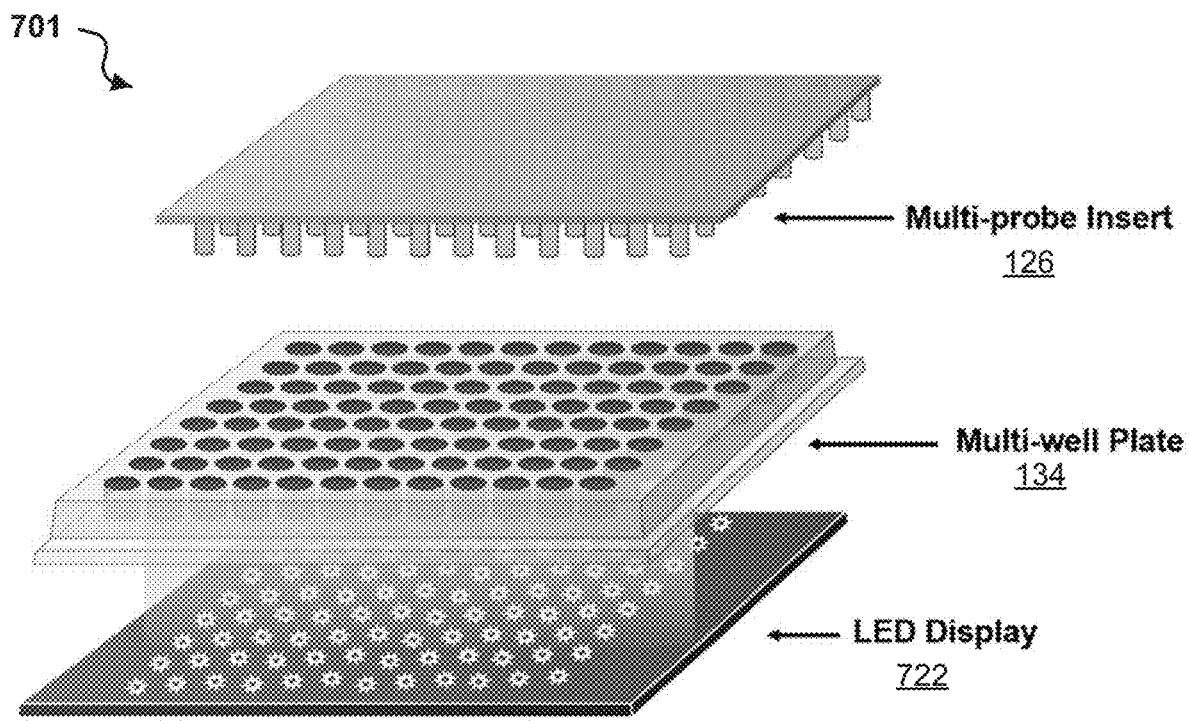
FIGS. 7A-7C show diagrams depicting an example embodiment of a high-throughput, maskless fabrication apparatus in accordance with the apparatus of FIG. 1A, which uses an LED display as the digital display device.
Figure 7B:
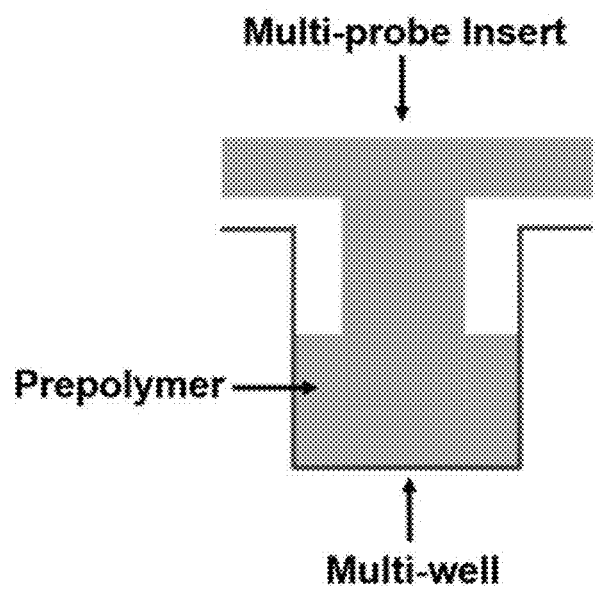
Figure 7C:
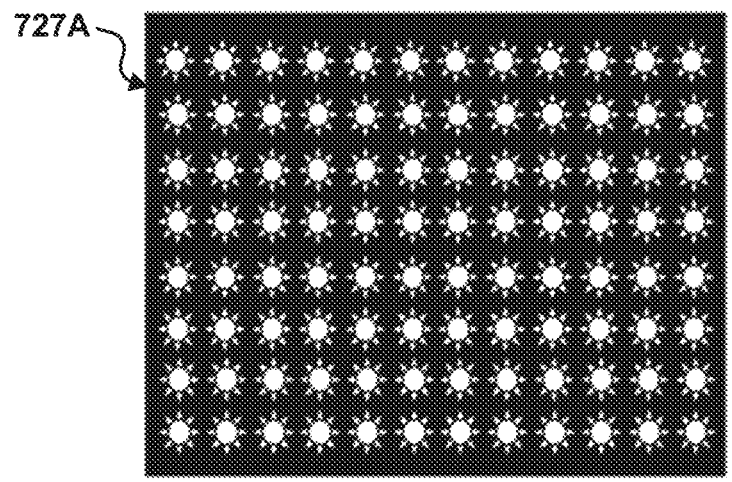
Figure 7C:
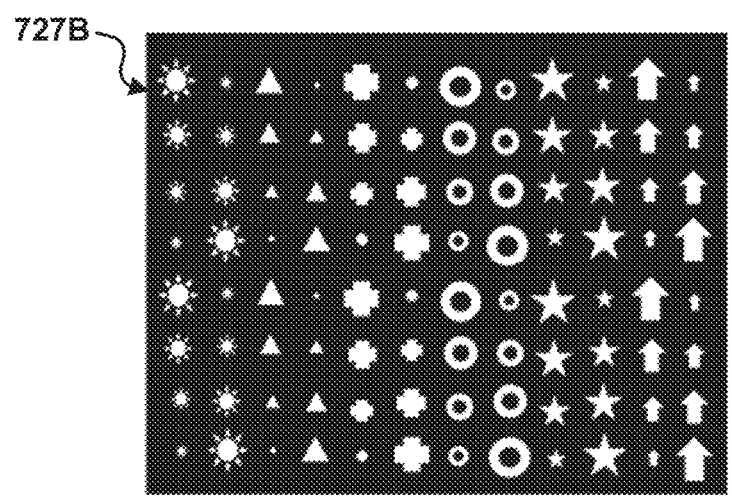
Figure 7C:
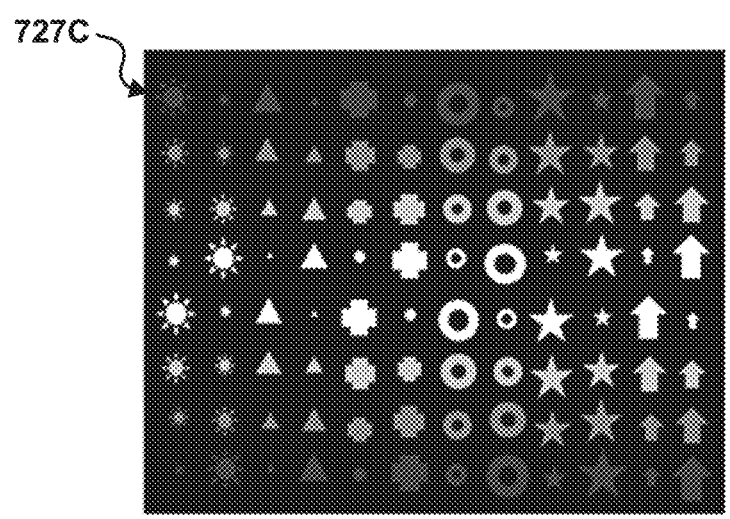

FIGS. 7A-7C show an example embodiment (Example 7) of a high-throughput, maskless fabrication apparatus 701 in accordance with the apparatus 100 that uses an LED display as the digital display device 120. As shown in FIG. 7A, the apparatus 701 includes an LED display 722, which can serve as (i) the light source to generate and modulate light and (ii) the platform (e.g., stage) to place the multi-well plate 134 for receiving the modulated light projected by the LED display 722 for selective polymerization of the solution in the wells of the multi-well plate 134 to produce the 3D scaffold or construct. The apparatus 701 includes the control unit 140, e.g., which can be embodied by a computer device in communication with the LED display 722.

For example, the light pattern produced and emitted by the LED display 722 is projected to the bottom of the multi-well plate 134 for selective polymerization. The optical pattern on the LED display 722 can be controlled by the digital files uploaded by the computer, thus the printing process is digitalized. The digital files can be derived from any 3D models/files, such as computer-aided design (CAD), computed tomography (CT) scans, and magnetic resonance imaging (MRI) scans.

FIG. 7B shows an example embodiment of the multi-probe insert 136 that can be implemented in the example embodiment of the apparatus 701. The multi-probe insert 136 can be used to control the height of the prepolymer solution in the wells of the multi-well plate 134, and hence can control the height of the polymerized structure. For example, the multi-probe insert 136 can be used to eliminate the meniscus and control the height of the prepolymer solution for the fabrication. The probes can reach inside the multi-well plate 134. In implementations, for example, the probe pushes away the prepolymer solution and leaves a gap with the desired height of prepolymer for polymerization.

FIG. 7C shows an optical pattern 727A with an array of same design for each well, an optical pattern 727B with an array of various designs (shapes and dimensions), and an optical pattern 727C with an array of various designs and various gray scale values. As illustrated in FIG. 7C, the optical pattern producible by LED display 722 can be readily changed due to the digitalized nature of the process. Such changes of the optical patterns include the shape and the size of the patterns as well as the grey-scale value of the individual pixels. For example, the optical pattern 727A and 727B demonstrate the flexibility to change the design (shape and dimension) across the same panel of the optical pattern. Also, for example, by controlling the light intensity of emission from each LED pixel of the LED display 722, the apparatus 701 can also control the grey scale value of each pixel which defines the light exposure from each pixel, as shown by the example pattern 527C, thus controlling the local crosslinking density and material properties of the polymerized structures.

In some implementations to operate the apparatus 701, for example, the target wells in the multi-well plate 134 are first filled with the appropriate amount of prepolymer solution. Secondly, the multi-probe insert 136 is mounted onto the multi-well plate 134 to control the prepolymer liquid height. The multi-well plate 134 is mounted above the LED display 722. The desired optical patterns are uploaded to the LED display 722 by the computer. When the fabrication starts, the optical pattern is focused on the bottom of the target wells in the multi-well plate 134. After the fabrication, the multi-probe insert 136 is removed from the multi-well plate 134 and the 3D structures will stay in the multi-well plate 134. To fabricate multi-material structures, for example, the unpolymerized part of the first prepolymer solution is removed at this step, and the second prepolymer solution is added to the target wells afterwards. The same multi-probe insert 136 (for the same height control) or a different multi-probe insert 136' (for a different height control) can be mounted onto the multi-well plate 134 again to control the height of the new prepolymer solution. The LED display 722 is then loaded with the new optical pattern designs for the fabrication of the new structure parts in addition to the first 3D structure. This process can be repeated to fabricate multi-material structures. After the fabrication is finished, the multi-well plate 134 with the 3D fabricated samples can be used for follow-up studies, such as imaging, incubation, testing drugs or assays, etc.

The fabrication apparatus 701 described above with reference to FIG. 7A is one example embodiment of the disclosed high-throughput, maskless fabrication apparatuses for fabricating scaffolds or constructs, which can be directly in a multi-well plate. In the example of FIG. 7A, the apparatus 701 includes the LED display device 722 that projects light upon and holds the multi-well plate 134, the multi-probe insert 136, and the control unit 140 (not shown), which may include a computer. In implementations, various features disclosed above can be used. The LED display 722 is designed to emit light that can initiate photopolymerization of a prepolymer solution mixed with the appropriate photoinitiator, including, for example, emitting light from UV to visible light and even further to near infrared light.

Example 8: LED Display+Liquid Volume Control

Figure 8A:
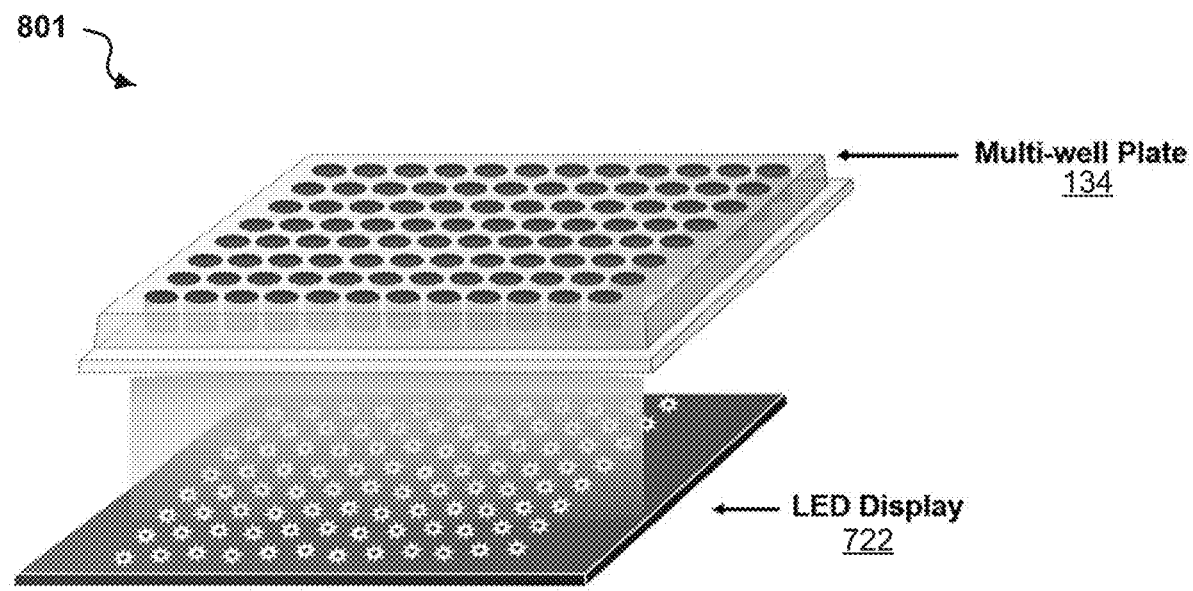
FIG. 8A-8C show diagrams depicting an example embodiment of a high-throughput, maskless fabrication apparatus in accordance with the apparatus of FIG. 1A, which uses an LED display as the digital display device, but does not include a multi-probe insert.
Figure 8B:
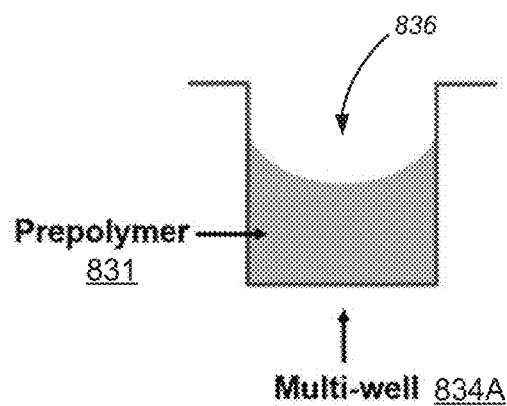
Figure 8C:
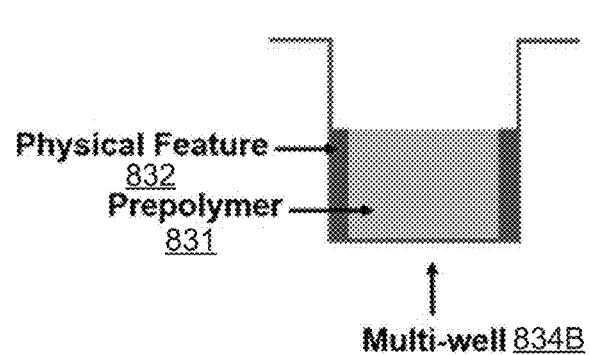

FIG. 8A-8C show an example embodiment (Example 8) of a high-throughput, maskless fabrication apparatus 801 in accordance with the apparatus 100 that uses an LED display as the digital display device 120, but does not include a multi-probe insert. The apparatus 601 in Example 6 is a derivative of the example embodiment of the apparatus 701 in Example 7, where the polymerized structure height is controlled by controlling the liquid volume without the use of the multi-probe insert 136. The height of the prepolymer solution in each well of the multi-well plate 134 is directly related to the volume of the prepolymer solution added into the well.

FIGS. 8B and 8C show diagrams illustrating example variations that use the multi-well plates 134. The diagram of FIG. 8B shows a zoom-in cross-sectional view of one regular well 834A of the multi-well plate 134 filled with prepolymer solution 831. The meniscus 836 is formed near the sidewall of the well 834A at the surface of the liquid. The liquid height is controlled by the volume filled into each well. The diagram of FIG. 8C shows a zoom-in cross-sectional view of a customized or modified well 834B filled with prepolymer solution 831. The sidewall of the modified well 834B has a physical feature (e.g., a step feature) which eliminates the meniscus. The diagram of FIG. 8C shows a variation that uses the specially-modified well 834B of the multi-well plate 134 having the physical feature 832 on the side wall (e.g., step edge) of the well 834B to reduce or eliminate the meniscus. In both variations of FIGS. 8B and 8C, the sidewall surface can be further coated with a coating material (e.g., hydrophobic or super-hydrophobic coatings, such as silicone, fluoropolymer, fluorinated coatings, EPDM, buna nitrile, and/or petroleum jelly) to further reduce or eliminate the meniscus.

In some implementations to operate the apparatus 801, for example, the target wells in the multi-well plate 134 are first filled with the appropriate amount of prepolymer solution. The volume of the prepolymer solution in each well is precisely controlled to provide the desired the prepolymer liquid height. The multi-well plate 134 is mounted above the LED display 722. The desired optical patterns are uploaded to the LED display 722 by the computer. The computer controls the light output of the LED display 722. The optical pattern is focused on the bottom of the target wells in the multi-well plate 134. To fabricate multi-material structures, for example, the unpolymerized part of the first prepolymer solution will be removed at this step and the second prepolymer solution will be added to the target wells afterwards. The volume of the second prepolymer solution is precisely controlled to control the height of the new prepolymer solution. The LED display 722 is then loaded with the new optical pattern designs for the fabrication of the new structure parts in addition to the first 3D structure. This process can be repeated to fabricate multi-material structures. After the fabrication is finished, the multi-well plate 134 with the 3D fabricated samples can be used for follow-up studies, such as imaging, incubation, testing drugs or assays, etc.

Example Applications

High-Throughput Fabrication of Polymer Scaffolds

One example application of the disclosed technology is to directly fabricate polymer scaffolds (e.g., hydrogel scaffolds) in the multi-well plates in a high-throughput fashion. Such fabrication can happen at once for all the wells or some target wells in a plate. The polymer scaffolds can feature various shapes with micron scale resolution, as shown in the images shown in FIG. 9.

Figure 9:
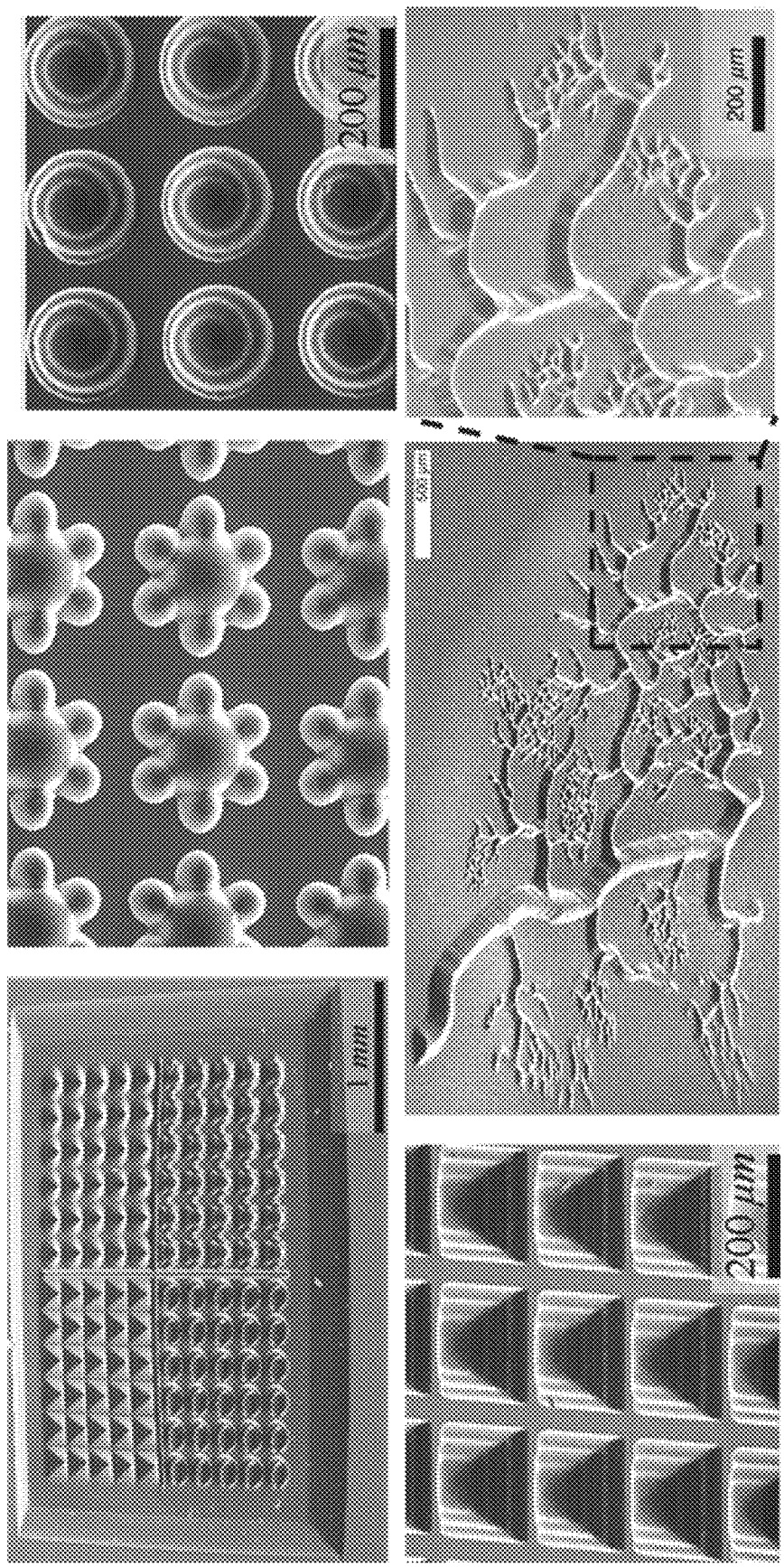
FIG. 9 shows a panel of images depicting example polymer scaffolds with various shapes.

FIG. 9 shows a panel of images depicting example polymer scaffolds with various shapes. The example shapes shown in the images of FIG. 9 include a flower shape, spiral shape, pyramid shape, as well as vascular network. Cells can be subsequently seeded and cultured on these scaffolds for biological studies and pharmaceutical applications. The geometries of the scaffolds can guide the cell behavior (e.g., proliferation and differentiation) and function. For instance, cell can grow into organoids to test drugs. It can also be used to study the interactions between the cells with other cell types or with the matrix materials. In addition to the geometrical control, the material properties (e.g., stiffness and porosity) of the polymer scaffolds can be regionally tuned and controlled with the disclosed apparatus. Such material properties can also be used to guide the cell behavior and function. Since these polymer scaffolds are directly printed in the multi-well plates, they can be easily adapted to the high-throughput screening systems widely used in the pharmaceutical industry.

High-Throughput Printing of Tissue Constructs

Another exemplary application of the disclosed technology is to fabricate cell-laden tissue constructs using various cell types mixed with biomaterials. Such fabrication can happen at once for all the wells or some target wells in a plate. Multi-step fabrication can be used to fabricate tissue constructs containing multiple cell types with precise control of the heterogeneous cell distributions. For instance, as shown by the example diagrams and images in FIGS. 10A-10C, biomimetic liver tissues patterned with multiple cell and material compositions can be made to mimic the native liver tissue.

Figure 10A:
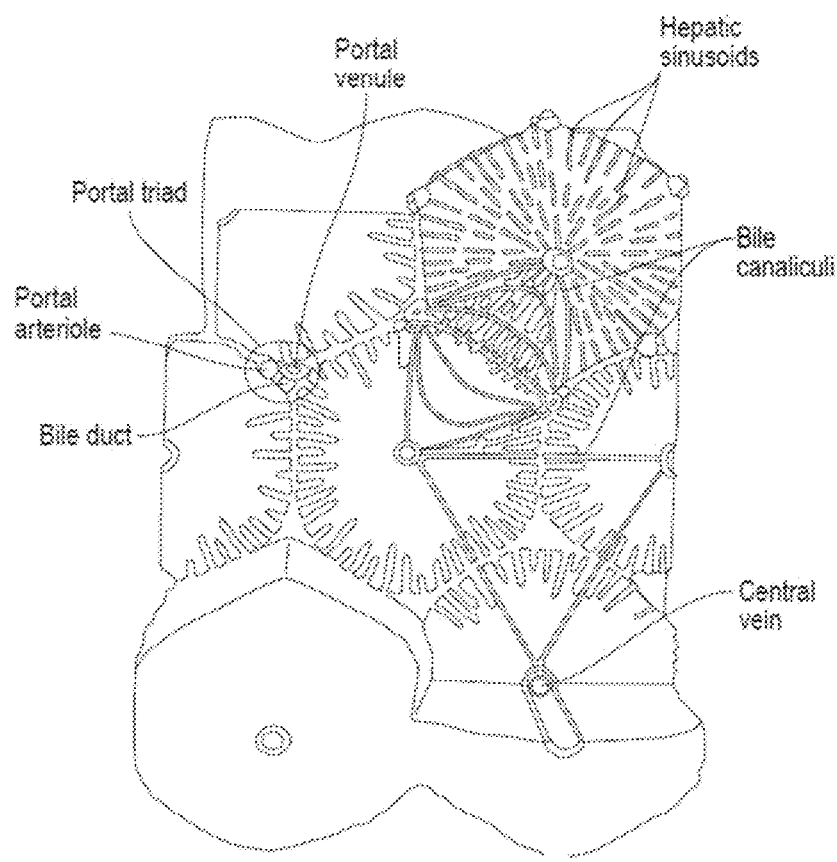
FIGS. 10A-10C show diagrams and images depicting a biomimetic liver tissue patterned with multiple cell and material compositions made to mimic the native liver tissue.
Figure 10B:
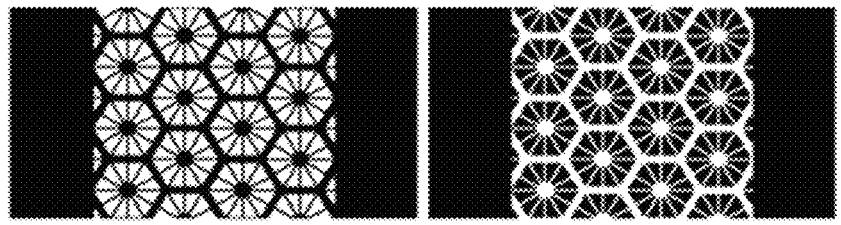
Figure 10C:
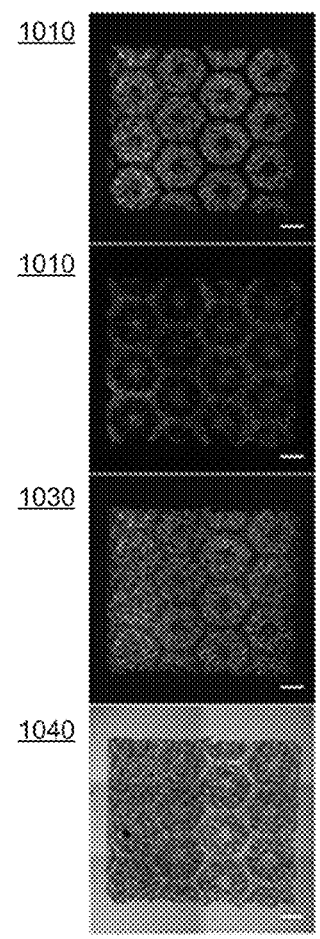

FIG. 10A shows an illustrative diagram of a liver lobule. FIG. 10B shows a diagram illustrating example grayscale digital patterns for polymerizing lobule structure (left) and vascular structure (right) for a two-step bioprinting process. The white areas represent light reflecting patterns for photo-topolymerization. FIG. 10C shows example fluorescent images 1010, 1020, 1030 and bright field image 1040 showing patterns of fluorescently labeled hepatocytes (green, top image 1010) in one biomaterial composition and supporting cells (red, in image 1020, 1030) in another biomaterial composition. The scale bars shown in the images in FIG. 10C are 500 μm.

Similarly, the fabrication based on the disclosed technology can be used for high-throughput fabrication of various 3D tissue models in the multi-well plates, such as cardiac tissues, kidney tissues, lung tissues, nerve tissues, muscle tissues, cartilage tissues, etc. Such tissue products can feature biomimetic 3D geometries as well as cellular compositions mimicking the native tissues and in vivo environment, which cannot be achieved by conventional 2D cell cultures. These 3D tissue products can be used for applications such as drug screening, therapeutics, diagnostics as well as biological studies. Since these 3D tissues are directly printed in the multi-well plates, they are inherently compatible with the high-throughput screening systems widely used in the pharmaceutical industry.

EXAMPLES

The following examples are illustrative of several embodiments of the present technology. Other exemplary embodiments of the present technology may be presented prior to the following listed examples, or after the following listed examples.

In some embodiments in accordance with the present technology (example A1), a scaffold fabrication device for using an optical pattern for fabricating scaffolds or tissue constructs directly in a multi-well plate includes (i) a light source to produce probe light, (ii) a digital display device to receive the probe light and to cause spatial modulation of the received probe light to produce a predetermined spatial pattern on the probe light, (iii) a projection optical module located to receive the probe light carrying the predetermined spatial pattern and to project the probe light; (iv) a motorized stage to hold a multi-well plate that includes different wells and to move the multi-well plate relative to the projection optical module; (v) a multi-probe insert with different probes that are designed to spatially correspond to the different wells of the multi-well plate, respectively; and (vi) a control module coupled to control the light source, the display device and the motorized stage to direct the probe light carrying with the predetermined spatial pattern to the wells to cause photopolymerization of a solution in a well to form a scaffold or tissue construct.

In some embodiments in accordance with the present technology (example A2), a scaffold fabrication device for using an optical pattern for fabricating scaffolds or tissue constructs directly in a multi-well plate includes (i) a light pattern device including an array of light-emitting diodes (LEDs) with each LED operable to produce a probe light beam and different LEDs being controlled to produce an array of probe light beams to collectively carry a predetermined spatial pattern on the probe light beams; where the light carrying the predetermined spatial pattern is projectable on a multi-well plate that includes different wells located to receive the probe light beams from the light pattern device; (ii) a multi-probe insert with different probes that are designed to spatially correspond to the different wells of the multi-well plate, respectively; and (iii) a control module coupled to control the light pattern device to direct the probe light beams carrying the predetermined spatial pattern to the wells to cause photopolymerization of a solution in a well to form a scaffold or tissue construct.

In some embodiments in accordance with the present technology (example A3), a method for using an optical pattern to fabricate scaffolds or tissue constructs directly in a multi-well plate without using a photomask includes placing solutions in different wells of a multi-well plate, respectively, to control a volume of a solution in a well; and directing probe light carrying a predetermined spatial pattern to the multi-well plate to expose the solutions in the different wells to the probe light to cause photopolymerization of a solution in a well to form a scaffold or tissue construct.

Example A4 includes the method of example A3, wherein the method further includes using a multi-probe insert with different probes that are designed to spatially correspond to the different wells of the multi-well plate, respectively, to, after filling the wells with the solutions, to direct the probes into the wells to control a volume in each well.

In some embodiments in accordance with the present technology (example B1), a high-throughput, maskless fabrication apparatus for fabricating scaffolds or constructs includes a light source to produce a probe light; a digital display device to receive the probe light and to cause spatial modulation of the received probe light to produce a programmable spatial pattern in a spatially-modulated light; a stage to hold a target surface or chamber, wherein the target surface or chamber contains a solution including a material that forms a scaffold or construct based on interaction with the spatially-modulated light projected at the solution; and a computer control device in communication with the light source and the digital display device to control a change of the solution including the material to form the scaffold or construct.

Example B2 includes the apparatus of any of examples B1-B24, wherein the programmable spatial pattern is a predetermined or predesigned pattern provided by the computer control device in a digital format to the digital display device.

Example B3 includes the apparatus of any of examples B1-B24, wherein the target surface or chamber includes a single-well plate or a multi-well plate.

Example B4 includes the apparatus of any of examples B1-B24, wherein the multi-well plate includes a standard multi-well plate including 2, 4, 6, 8, 12, 24, 48, 96, or 384 wells.

Example B5 includes the apparatus of any of examples B1-B24, wherein the digital display device includes one or more of a digital micromirror device (DMD), a liquid crystal display (LCD), or a light-emitting diode (LED) display.

Example B6 includes the apparatus of any of examples B1-B24, wherein the digital display device is operable as the light source to produce and spatially modulate the probe light.

Example B7 includes the apparatus of any of examples B1-B24, wherein the stage includes a motorized stage to hold the target surface or chamber and to move the target surface or chamber to a particular plane for projection of the spatially-modulated light carrying the programmable spatial pattern.

Example B8 includes the apparatus of any of examples B1-B24, wherein the digital display device is operable as the stage to hold the target surface or chamber to receive the spatially-modulated light.

Example B9 includes the apparatus of any of examples B1-B24, wherein the computer control device is configured to control one or more operations of the light source and the digital display device to regulate photopolymerization of the solution including the material to form the scaffold or construct on the target surface or chamber.

Example B10 includes the apparatus of any of examples B1-B24, wherein the formed scaffold or construct includes a 3D polymer scaffold or an engineered construct for a biological tissue.

Example B11 includes the apparatus of any of examples B1-B24, wherein the apparatus is configured to selectively polymerize and define one or more of a shape, a size, or a mechanical property of the polymer scaffold or biological tissue construct.

Example B12 includes the apparatus of any of examples B1-B24, wherein the material of the solution on the target surface or chamber for fabrication the polymer scaffold or the biological tissue construct includes at least one of a photopolymerizable monomer solution, photoinitiator, cell, nanoparticle, or biomolecule.

Example B13 includes the apparatus of any of examples B1-B24, further including one or more optical components, positioned between the light source and the digital display device, configured to collimate and/or expand the probe light emitted by the light source to the digital display device.

Example B14 includes the apparatus of any of examples B1-B24, wherein the one or more optical components include one or more of lenses, diffusers or a homogenizer.

Example B15 includes the apparatus of any of examples B1-B24, further including an optical module, positioned between the digital display device and the stage, configured to project the spatially-modulated light on the target surface or chamber.

Example B16 includes the apparatus of any of examples B1-B24, wherein the target surface or chamber is pre-treated to promote adhesion of the formed scaffold or construct to the target surface or chamber.

Example B17 includes the apparatus of any of examples B1-B24, wherein a side wall of the target chamber includes a physical feature to reduce or eliminate a meniscus formed between the solution and the side wall of the target chamber.

Example B18 includes the apparatus of any of examples B1-B24, wherein a side wall surface of the target chamber includes a hydrophobic coating or a superhydrophobic coating to reduce or eliminate a meniscus formed between the solution and the side wall surface of the target chamber.

Example B19 includes the apparatus of any of examples B1-B24, further including a probe insert module configured to be placed proximate the target surface or chamber and interface with the solution, such that the probe insert module is operable to control one or both of a thickness and a height of the scaffold or construct to be formed.

Example B20 includes the apparatus of any of examples B1-B24, wherein the probe insert module includes a spacer structure that protrudes into the target chamber and displaces the solution in the target chamber.

Example B21 includes the apparatus of any of examples B1-B24, wherein the probe insert module includes a plurality of different probes that are designed to spatially correspond to different wells of a multi-well plate.

Example B22 includes the apparatus of any of examples B1-B24, further including a housing enclosure that encloses at least the light source, the digital display device and the stage that holds the target surface or chamber to prevent light from leaking out of the enclosure.

Example B23 includes the apparatus of any of examples B1-B24, wherein the housing enclosure is structured to provide a sterile biofabrication environment.

Example B24 includes the apparatus of any of examples B1-B23, wherein the computer control device includes a desktop computer, a laptop computer, a smartphone, a tablet, or a wearable computing device.

In some embodiments in accordance with the present technology (example B25), a high-throughput, maskless fabrication apparatus for using an optical pattern for fabricating scaffolds or tissue constructs directly in a multi-well plate includes a light pattern device including an array of light-emitting diodes (LEDs) with each LED operable to produce a probe light beam and different LEDs being controlled to an array of probe light beams to collectively carry a programmable spatial pattern on the probe light beams, wherein the probe light beams carrying the programmable spatial pattern is projectable on a target surface or chamber that receive the probe light beams from the light pattern device; and a control module coupled to control the light pattern device to direct the probe light beams carrying with the predetermined spatial pattern to the wells to cause photopolymerization of a solution in a well to form a scaffold or tissue construct.

Example B26 includes the apparatus of any of examples B25-B28, wherein the programmable spatial pattern is a predetermined or predesigned pattern provided by the computer control device in a digital format to the digital display device.

Example B27 includes the apparatus of any of examples B25-B28, wherein the target surface or chamber includes a single-well plate or a multi-well plate.

Example B28 includes the apparatus of any of examples B25-B27, wherein the apparatus includes the feature or features of the apparatus recited in one or more of examples A2-A24.

In some embodiments in accordance with the present technology (example B29), a method for fabricating scaffolds or constructs directly without using a photomask includes emitting a probe light by a light source; spatially-modulating the probe light based on a programmable spatial pattern to produce a pattern-encoded light; and directing the pattern-encoded light carrying the programmable spatial pattern at a target surface or chamber to expose a solution including a material on the target surface or in the target chamber to the encoded light, such that the solution undergoes a change to produce a scaffold or construct.

Example B30 includes method of any of examples B29-B36, wherein the probe light is spatially-modulated by a digital display device that includes one or more of a digital micromirror device (DMD), a liquid crystal display (LCD), or a light-emitting diode (LED) display.

Example B31 includes method of any of examples B29-B36, further includes transferring the programmable spatial pattern by a computer control device in a digital format to the digital display device.

Example B32 includes method of any of examples B29-B36, wherein the target surface or chamber includes a multi-well plate, and wherein the directing the pattern-encoded light includes projecting the pattern-encoded light at two or more wells of the multi-well plate to expose solutions contained in at least some different wells to cause photopolymerization of the solution in the respective well to form the polymer scaffold or tissue construct.

Example B33 includes method of any of examples B29-B36, further including applying a multi-probe insert having different probes designed to spatially correspond to the different wells of the multi-well plate into the wells of the multi-well plate to control a volume of the solution in each probe-inserted well.

Example B34 includes method of any of examples B29-B36, further including controlling a volume of monomer solution added to the two or more wells of the multi-well plate, wherein the controlled volume of the monomer assists in controlling a thickness of the polymer scaffold or tissue construct formed in the respective well.

Example B35 includes method of any of examples B29-B36, further including pre-treating the target surface or chamber to promote adhesion of the formed scaffold or construct to the target surface or chamber and/or to reduce or eliminate a meniscus formed between the solution and a side of the target surface or chamber.

Example B36 includes method of any of examples B29-B35, wherein the target surface or chamber includes a single-well plate or a multi-well plate.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A high-throughput, maskless fabrication apparatus for fabricating scaffolds or constructs, comprising:
    a light source to produce a probe light;
    a digital display device to receive the probe light and to cause spatial modulation of the received probe light to produce a programmed spatial pattern in a spatially-modulated light;
    a stage to hold a target surface or chamber including a multi-well plate comprising two or more wells, wherein the target surface or chamber contains at least one solution including a material or multiple materials that forms a scaffold or construct based on interaction with the spatially-modulated light projected at the solution; and
    a computer control device in communication with the light source and the digital display device to control a change of the solution including the material or multiple materials to form the scaffold or construct,
    wherein the digital display device is configured to generate optical patterns which are projected from beneath the multi-well plate to (i) an entire bottom of the multi-well plate, thereby exposing the solution contained in two or more different wells to the optical patterns such that selective photopolymerization of the solution occurs in each of the two or more different wells simultaneously or (ii) a part of a bottom of the multi-well plate, thereby exposing the solution contained in two or more different wells to the optical patterns such that selective photopolymerization of the solution occurs in each of the two or more different wells simultaneously.

2. The apparatus of claim 1, wherein the programmed spatial pattern is a predetermined or predesigned pattern provided by the computer control device in a digital format to the digital display device.

3. The apparatus of claim 1, wherein the stage is configured to hold a multi-well plate comprising 2, 4, 6, 8, 12, 24, 48, 96, or 384 wells.

4. The apparatus of claim 1, wherein the digital display device includes one or more of a digital micromirror device (DMD), a liquid crystal display (LCD), or a light-emitting diode (LED) display.

5. The apparatus of claim 1, wherein the digital display device is operable as the light source to produce and spatially module the probe light.

6. The apparatus of claim 1, wherein the stage includes a motorized stage to hold the target surface or chamber and to move the target surface or chamber to a particular plane for projection of the spatially-modulated light carrying the programmed spatial pattern.

7. The apparatus of claim 1, wherein the digital display device is operable as the stage to hold the target surface or chamber to receive the spatially-modulated light.

8. The apparatus of claim 1, wherein the computer control device is configured to control one or more operations of the light source and the digital display device to regulate sequential photopolymerization of a plurality of solutions including the material or multiple materials to form the scaffold or construct on the target surface or chamber.

9. The apparatus of claim 8, wherein the formed scaffold or construct includes a 3D polymer scaffold or an engineered construct for a biological tissue.

10. The apparatus of claim 9, wherein the apparatus is configured to selectively polymerize and define one or more of a shape, a size, or a mechanical property of the 3D polymer scaffold or the engineered construct for the biological tissue.

11. The apparatus of claim 1, wherein the material or multiple materials of the solution on the target surface or chamber for fabrication of the scaffold or the construct includes at least one of a photopolymerizable monomer solution, photoinitiator, cell, nanoparticle, or biomolecule.

12. The apparatus of claim 1, further comprising:
one or more optical components, positioned between the light source and the digital display device, configured to collimate and/or expand the probe light emitted by the light source to the digital display device, wherein the one or more optical components include one or more of lenses, diffusers or a homogenizer.

13. The apparatus of claim 1, further comprising:
an optical module, positioned between the digital display device and the stage, configured to project the spatially-modulated light on the target surface or chamber.

14. The apparatus of claim 1, wherein the target surface or chamber is pre-treated to promote adhesion of the formed scaffold or construct to the target surface or chamber.

15. The apparatus of claim 1, wherein a side wall of the target chamber includes a physical feature to reduce or eliminate a meniscus formed between the solution and the side wall of the target chamber.

16. The apparatus of claim 1, wherein a side wall surface of the target chamber includes a hydrophobic coating or a superhydrophobic coating to reduce or eliminate a meniscus formed between the solution and the side wall surface of the target chamber.

17. The apparatus of claim 1, further comprising:
a probe insert module configured to be placed proximate to the target surface or chamber and interface with the solution, such that the probe insert module is operable to control one or both of a thickness and a height of the scaffold or construct to be formed,
wherein the probe insert module includes at least one of: a spacer structure that protrudes into the target chamber and displaces the solution in the target chamber, or a plurality of different probes that are designed to spatially correspond to different wells of the multi-well plate.

18. The apparatus of claim 1, further comprising:
a housing enclosure that encloses at least the light source, the digital display device and the stage that holds the target surface or chamber to prevent light from leaking out of the housing enclosure, wherein the housing enclosure is structured to provide a sterile biofabrication environment.

19. The apparatus of claim 1, wherein the material or materials that will form the scaffold or construct are included in multiple solutions, respectively, and wherein the apparatus is configured to sequentially receive each of the multiple solutions at the target surface or chamber and interact each of the respective material or materials with the spatially-modulated light projected at the respective solution to fabricate a multi-material heterogeneous structure of the scaffold or construct to be formed.

* * * * *